United States Patent
Sato et al.

(10) Patent No.: US 9,954,234 B2
(45) Date of Patent: Apr. 24, 2018

(54) FUEL CELL SYSTEM AND CONTROL METHOD THEREOF

(71) Applicant: TOYOTA JIDOSHA KABUSHIKI KAISHA, Toyota-shi, Aichi-ken (JP)

(72) Inventors: Hiromichi Sato, Hadano (JP); Shigeki Hasegawa, Susono (JP); Atsuo Iio, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 32 days.

(21) Appl. No.: 15/094,328

(22) Filed: Apr. 8, 2016

(65) Prior Publication Data

US 2016/0301089 A1  Oct. 13, 2016

(30) Foreign Application Priority Data

Apr. 10, 2015 (JP) ................................ 2015-081273

(51) Int. Cl.
| | | |
|---|---|---|
| *H01M 8/04* | (2016.01) | |
| *H01M 8/10* | (2016.01) | |
| *H01M 8/04007* | (2016.01) | |
| *H01M 8/04029* | (2016.01) | |
| *H01M 8/04746* | (2016.01) | |
| *H01M 8/04701* | (2016.01) | |
| *H01M 8/1004* | (2016.01) | |

(52) U.S. Cl.
CPC ... *H01M 8/04067* (2013.01); *H01M 8/04029* (2013.01); *H01M 8/04723* (2013.01); *H01M 8/04768* (2013.01); *H01M 8/1004* (2013.01)

(58) Field of Classification Search
CPC ......... H01M 8/04029; H01M 8/04067; H01M 8/04723; H01M 8/04768; H01M 8/1004
See application file for complete search history.

(56) References Cited

U.S. PATENT DOCUMENTS

2003/0072981 A1    4/2003 Imaseki et al.

FOREIGN PATENT DOCUMENTS

| | | |
|---|---|---|
| JP | 2007-311087 A | 11/2007 |
| JP | 2010-097709 A | 4/2010 |
| JP | 2014-157832 A | 8/2014 |

*Primary Examiner* — Carlos Barcena
(74) *Attorney, Agent, or Firm* — Andrews Kurth Kenyon LLP

(57) ABSTRACT

A fuel cell system comprises a fuel cell stack, radiator, stack side cooling water passage, radiator side cooling water passage, bypass cooling water passage, deionizer, stack side cooling water pump, and radiator side cooling water pump. The pump are formed from rotary pumps able to change directions and amounts of cooling water discharged by changes of drive speeds. Drive speeds of the pumps are controlled to thereby control an amount of cooling water flowing through the radiator side cooling water passage, an amount of the cooling water flowing through the stack side cooling water passage, and a direction and amount of the cooling water flowing through the bypass cooling water passage.

17 Claims, 15 Drawing Sheets

FUEL CELL SYSTEM AND CONTROL METHOD THEREOF

RELATED APPLICATIONS

This application claims the benefit of JP Application No. 2015-081273, the entire disclosure of which is incorporated by reference herein.

BACKGROUND OF THE INVENTION

1. Field of the Invention

Embodiments of the present invention relate to a fuel cell system and a method of control of the same.

2. Related Art

A fuel cell system is known in the art, which is provided with a fuel cell stack configured to generate electric power by an electrochemical reaction between hydrogen gas and air, a radiator configured to lower a temperature of a cooling water for the fuel cell stack. The fuel cell system is further provided with a cooling water feed passage connecting together an outlet of an in-radiator cooling water passage in the radiator and an inlet of an in-stack cooling water passage in the fuel cell stack. The cooling water feed passage includes a feed side branching point, a radiator outflow passage from the outlet of the in-radiator cooling water passage to the feed side branching point, and a stack inflow passage from the feed side branching point to the inlet of the in-stack cooling water passage. The fuel cell system is further provided with a cooling water discharge passage connecting together an outlet of the in-stack cooling water passage and an inlet of the in-radiator cooling water passage. The cooling water discharge passage includes a discharge side branching point, a stack outflow passage from the outlet of the in-stack cooling water passage to the discharge side branching point, and a radiator inflow passage from the discharge side branching point to the inlet of the in-radiator cooling water passage. The fuel cell system is further provided with a bypass cooling water passage connecting together the feed side branching point and the discharge side branching point, a check valve arranged in the bypass cooling water passage and enabling the cooling water to flow through the bypass cooling water passage only from the cooling water discharge passage to the cooling water feed passage, a stack side cooling water pump arranged in the stack inflow passage so that its outlet faces the fuel cell stack, and a radiator side cooling water pump arranged in the radiator inflow passage so that its outlet faces the radiator. In the fuel cell system, if a temperature of the cooling water flowing out from the in-stack cooling water passage is lower than a prescribed temperature, the fuel cell system drives the stack side cooling water pump and stops the radiator side cooling water pump, whereby the cooling water circulates through a first route formed by the stack inflow passage, in-stack cooling water passage, stack outflow passage, and bypass cooling water passage, without flowing through the in-radiator cooling water passage. If the temperature of the cooling water flowing out from the in-stack cooling water passage is higher than the prescribed temperature, the fuel cell system drives the stack side cooling water pump and the radiator side cooling water pump, whereby the cooling water circulates through a second route formed by the cooling water feed passage, in-stack cooling water passage, cooling water discharge passage, and in-radiator cooling water passage, without flowing through the bypass cooling water passage (for example, see Japanese Patent Publication No. 2010-097709A). According to Japanese Patent Publication No. 2010-097709A, the radiator side cooling water pump which is stopped acts as a closed valve. For this reason, the cooling water having flowed through the stack outflow passage flows into the bypass cooling water passage without flowing into the radiator inflow passage, therefore the cooling water circulates through the first route. That is, if the temperature of the cooling water is low, the cooling water is kept from being cooled by the radiator.

SUMMARY

However, a mere stoppage of a cooling water pump cannot reliably stop a flow of the cooling water which passes through the cooling water pump. That is, for example, if the radiator side cooling water pump is formed from a rotary pump, even if the cooling water pump is stopped, the cooling water flows between impellers and a casing or between the impellers to pass through the cooling water pump. For this reason, in the fuel cell system of Japanese Patent Publication No. 2010-097709A, even if the radiator side cooling water pump is stopped, part of the cooling water actually passes through the radiator side cooling water pump. Thus, if the temperature of the cooling water is low, the cooling water may flow into the radiator. On this point, for example, if providing a shutoff valve which is closed when the temperature of the cooling water is low in the radiator inflow passage, the cooling water can be prevented from flowing into the radiator when the temperature of the cooling water is low. However, in this case, not only does the number of parts increase, but also control of the shutoff valve is necessary.

Further, in Japanese Patent Publication No. 2010-097709A, the check valve is arranged in the bypass cooling water passage. This feature is adopted for the following reason. If a check valve is not provided, it is difficult for the cooling water to flow through the bypass cooling water passage well when the cooling water should be made to flow through the bypass cooling water passage, and the cooling water may flow through the bypass cooling water passage when the cooling water should not be made to flow through the bypass cooling water passage. In other words, in Japanese Patent Publication No. 2010-097709A, the check valve is indispensable for a reliable control of the flow of the cooling water.

Therefore, a fuel cell system is considered necessary which can reliably control a flow of a cooling water with a less expensive and more simpler design.

According to one embodiment of the present invention, there is provided a fuel cell system that includes a fuel cell stack configured to generate electric power by an electrochemical reaction between fuel gas and an oxidizing gas; a radiator configured to lower a temperature of a cooling water for the fuel cell stack; and a cooling water feed passage connecting an outlet of an in-radiator cooling water passage in the radiator and an inlet of an in-stack cooling water passage in the fuel cell stack with each other and a cooling water discharge passage connecting an outlet of the in-stack cooling water passage and an inlet of the in-radiator cooling water passage with each other. The cooling water feed passage includes a feed side branching point, a radiator outflow passage from the outlet of the in-radiator cooling water passage to the feed side branching point, and a stack inflow passage from the feed side branching point to the inlet of the in-stack cooling water passage. The cooling water discharge passage includes a discharge side branching point, a stack outflow passage from the outlet of the in-stack cooling water passage to the discharge side branching point, and a radiator inflow passage from the discharge side branching point to the inlet of the in-radiator cooling water passage, the stack inflow passage, the in-stack cooling water passage, and the stack outflow passage configuring a stack side cooling water passage, and the radiator inflow passage, the in-radiator cooling water passage, and the radiator outflow passage configuring a radiator side cooling water passage. The fuel cell system includes a bypass cooling water passage connecting the feed side branching point and the discharge side branching point with each other, through which the cooling water can flow between the feed side branching point and the discharge side branching point in both directions. A stack side cooling water pump is also provided that is capable changing an amount of the cooling water discharged, but not capable of changing a direction of the cooling water discharged, the stack side cooling water pump being arranged in the stack inflow passage so that an outlet thereof faces the fuel cell stack or being arranged in the stack outflow passage so that an inlet thereof faces the fuel cell stack. A radiator side cooling water pump is provided that is formed from a rotary pump able to change a direction and amount of the cooling water discharged by a change of a drive speed thereof, the radiator side cooling water pump having a property that a discharge amount in a forward direction becomes greater as the drive speed becomes greater when the drive speed is a positive value and the discharge amount in a reverse direction becomes greater as the drive speed becomes smaller when the drive speed is a negative value, and the radiator side cooling water pump being arranged in the radiator inflow passage so that an outlet thereof when the discharge direction is the forward direction faces the radiator or being arranged in the radiator outflow passage so that an inlet thereof when the discharge direction is the forward direction faces the radiator. Also, a controller is provided that is configured to control the stack side cooling water pump and the radiator side cooling water pump, respectively, to thereby control an amount of the cooling water flowing through the stack side cooling water passage, an amount of the cooling water flowing through the radiator side cooling water passage, and a direction and amount of the cooling water flowing through the bypass cooling water passage, respectively.

According another embodiment of the present invention, there is provided a method of control of a fuel cell system, the fuel cell system that includes a fuel cell stack configured to generate electric power by an electrochemical reaction between fuel gas and an oxidizing gas; a radiator configured to lower a temperature of a cooling water for the fuel cell stack; and a cooling water feed passage connecting an outlet of an in-radiator cooling water passage in the radiator and an inlet of an in-stack cooling water passage in the fuel cell stack with each other and a cooling water discharge passage connecting an outlet of the in-stack cooling water passage and an inlet of the in-radiator cooling water passage with each other. The cooling water feed passage includes a feed side branching point, a radiator outflow passage from the outlet of the in-radiator cooling water passage to the feed side branching point, and a stack inflow passage from the feed side branching point to the inlet of the in-stack cooling water passage. The cooling water discharge passage includes a discharge side branching point, a stack outflow passage from the outlet of the in-stack cooling water passage to the discharge side branching point, and a radiator inflow passage from the discharge side branching point to the inlet of the in-radiator cooling water passage. The stack inflow passage, the in-stack cooling water passage, and the stack outflow passage configure a stack side cooling water passage, and the radiator inflow passage, the in-radiator cooling water passage, and the radiator outflow passage configure a radiator side cooling water passage. A bypass cooling water passage is provided connecting the feed side branching point and the discharge side branching point with each other, through which the cooling water can flow between the feed side branching point and the discharge side branching point in both directions. A stack side cooling water pump is provided that is capable of changing an amount of the cooling water discharged, but is not capable of changing a direction of the cooling water discharged, the stack side cooling water pump being arranged in the stack inflow passage so that an outlet thereof faces the fuel cell stack or being arranged in the stack outflow passage so that an inlet thereof faces the fuel cell stack. A radiator side cooling water pump is provided that is formed from a rotary pump able to change a direction and amount of the cooling water discharged by a change of a drive speed thereof, the radiator side cooling water pump having a property that a discharge amount in a forward direction becomes greater as the drive speed becomes greater when the drive speed is a positive value and the discharge amount in a reverse direction becomes greater as the drive speed becomes smaller when the drive speed is a negative value, and the radiator side cooling water pump being arranged in the radiator inflow passage so that an outlet thereof when the discharge direction is the forward direction faces the radiator or being arranged in the radiator outflow passage so that an inlet thereof when the discharge direction is the forward direction faces the radiator. A controller is also provided that is configured to control the stack side cooling water pump and the radiator side cooling water pump, respectively, wherein the method is configured to control the stack side cooling water pump and the radiator side cooling water pump by the controller, respectively, to thereby control an amount of the cooling water flowing through the stack side cooling water passage, an amount of the cooling water flowing through the radiator side cooling water passage, and a direction and amount of the cooling water flowing through the bypass cooling water passage, respectively.

According to still another embodiment of the present invention, there is provided a fuel cell system that includes a fuel cell stack configured to generate electric power by an electrochemical reaction between fuel gas and an oxidizing gas; a radiator configured to lower a temperature of a cooling water for the fuel cell stack; a cooling water feed passage connecting an outlet of an in-radiator cooling water passage in the radiator and an inlet of an in-stack cooling water passage in the fuel cell stack with each other and a cooling water discharge passage connecting an outlet of the in-stack cooling water passage and an inlet of the in-radiator cooling water passage with each other. The cooling water feed passage includes a feed side branching point, a radiator outflow passage from the outlet of the in-radiator cooling water passage to the feed side branching point, and a stack inflow passage from the feed side branching point to the inlet of the in-stack cooling water passage. The cooling water discharge passage includes a discharge side branching point, a stack outflow passage from the outlet of the in-stack cooling water passage to the discharge side branching point, and a radiator inflow passage from the discharge side branching point to the inlet of the in-radiator cooling water passage, the stack inflow passage, the in-stack cooling water passage, and the stack outflow passage configuring a stack side cooling water passage, and the radiator inflow passage, the in-radiator cooling water passage, and the radiator outflow passage configure a radiator side cooling water passage. A bypass cooling water passage is provided connecting the feed side branching point and the discharge side branching point with each other, through which the cooling water can flow between the feed side branching point and the discharge side branching point in both directions. A stack side cooling water pump is provided formed from a rotary pump that is capable of changing a direction and amount of the cooling water discharged by a change of a drive speed thereof, the stack side cooling water pump having a property that a discharge amount in a forward direction becomes greater as the drive speed becomes greater when the drive speed is a positive value and the discharge amount in a reverse direction becomes greater as the drive speed becomes smaller when the drive speed is a negative value. The stack side cooling water pump is arranged in the stack inflow passage so that an outlet thereof when the discharge direction is the forward direction faces the fuel cell stack or being arranged in the stack outflow passage so that an inlet thereof when the discharge direction is the forward direction faces the fuel cell stack. A radiator side cooling water pump is provided that is capable of changing an amount of the cooling water discharged, but is not capable of changing a direction of the cooling water discharged The radiator side cooling water pump is arranged in the radiator inflow passage so that an outlet thereof faces the radiator or is arranged in the radiator outflow passage so that an inlet thereof faces the radiator. A controller is also provided that is configured to control the stack side cooling water pump and the radiator side cooling water pump, respectively, to thereby control an amount of the cooling water flowing through the stack side cooling water passage, an amount of the cooling water flowing through the radiator side cooling water passage, and a direction and amount of the cooling water flowing through the bypass cooling water passage, respectively.

According to still another embodiment of the present invention, there is provided a method of control of a fuel cell system, where the fuel cell system includes a fuel cell stack configured to generate electric power by an electrochemical reaction between fuel gas and an oxidizing gas; a radiator configured to lower a temperature of a cooling water for the fuel cell stack; a cooling water feed passage connecting an outlet of an in-radiator cooling water passage in the radiator and an inlet of an in-stack cooling water passage in the fuel cell stack with each other and a cooling water discharge passage connecting an outlet of the in-stack cooling water passage and an inlet of the in-radiator cooling water passage with each other. The cooling water feed passage includes a feed side branching point, a radiator outflow passage from the outlet of the in-radiator cooling water passage to the feed side branching point, and a stack inflow passage from the feed side branching point to the inlet of the in-stack cooling water passage. The cooling water discharge passage includes a discharge side branching point, a stack outflow passage from the outlet of the in-stack cooling water passage to the discharge side branching point, and a radiator inflow passage from the discharge side branching point to the inlet of the in-radiator cooling water passage, the stack inflow passage, the in-stack cooling water passage, and the stack outflow passage configure a stack side cooling water passage, and the radiator inflow passage, the in-radiator cooling water passage, and the radiator outflow passage configure a radiator side cooling water passage. A bypass cooling water passage is provided connecting the feed side branching point and the discharge side branching point with each other, through which the cooling water can flow between the feed side branching point and the discharge side branching point in both directions. A stack side cooling water pump is provided formed from a rotary pump that is capable of changing a direction and amount of the cooling water discharged by a change of a drive speed thereof, the stack side cooling water pump having a property that a discharge amount in a forward direction becomes greater as the drive speed becomes greater when the drive speed is a positive value and the discharge amount in a reverse direction becomes greater as the drive speed becomes smaller when the drive speed is a negative value, and the stack side cooling water pump being arranged in the stack inflow passage so that an outlet thereof when the discharge direction is the forward direction faces the fuel cell stack or being arranged in the stack outflow passage so that an inlet thereof when the discharge direction is the forward direction faces the fuel cell stack. A radiator side cooling water pump is provided that is capable of changing an amount of the cooling water discharged, but is not capable of changing a direction of the cooling water discharged, the radiator side cooling water pump being arranged in the radiator inflow passage so that an outlet thereof faces the radiator or is arranged in the radiator outflow passage so that an inlet thereof faces the radiator. A controller is provided that is configured to control the stack side cooling water pump and the radiator side cooling water pump, respectively. The method of control is configured to control the stack side cooling water pump and the radiator side cooling water pump by the controller, respectively, to thereby control an amount of the cooling water flowing through the stack side cooling water passage, an amount of the cooling water flowing through the radiator side cooling water passage, and a direction and amount of the cooling water flowing through the bypass cooling water passage, respectively.

According to still another embodiment of the present invention, there is provided a fuel cell system that includes a fuel cell stack configured to generate electric power by an electrochemical reaction between fuel gas and an oxidizing gas; a radiator configured to lower a temperature of a cooling water for the fuel cell stack; a cooling water feed passage connecting an outlet of an in-radiator cooling water passage in the radiator and an inlet of an in-stack cooling water passage in the fuel cell stack with each other and a cooling water discharge passage connecting an outlet of the in-stack cooling water passage and an inlet of the in-radiator cooling water passage with each other. The cooling water feed passage includes a feed side branching point, a radiator outflow passage from the outlet of the in-radiator cooling water passage to the feed side branching point, and a stack inflow passage from the feed side branching point to the inlet of the in-stack cooling water passage. The cooling water discharge passage including a discharge side branching point, a stack outflow passage from the outlet of the in-stack cooling water passage to the discharge side branching point, and a radiator inflow passage from the discharge side branching point to the inlet of the in-radiator cooling water passage, the stack inflow passage, the in-stack cooling water passage, and the stack outflow passage configuring a stack side cooling water passage, and the radiator inflow passage, the in-radiator cooling water passage, and the radiator outflow passage configure a radiator side cooling water passage. A bypass cooling water passage connects the feed side branching point and the discharge side branching point with each other, through which the cooling water can flow between the feed side branching point and the discharge side branching point in both directions. A stack side cooling water pump is formed from a rotary pump able to change a direction and amount of the cooling water discharged by a change of a drive speed thereof, the stack side cooling water pump having a property that a discharge amount in a forward direction becomes greater as the drive speed becomes greater when the drive speed is a positive value and the discharge amount in a reverse direction becomes greater as the drive speed becomes smaller when the drive speed is a negative value, and stack side cooling water pump is arranged in the stack inflow passage so that an outlet thereof when the discharge direction is the forward direction faces the fuel cell stack or is arranged in the stack outflow passage so that an inlet thereof when the discharge direction is the forward direction faces the fuel cell stack. A radiator side cooling water pump is provided that is formed from a rotary pump able to change a direction and amount of the cooling water discharged by a change of a drive speed thereof, the radiator side cooling water pump having a property that a discharge amount in a forward direction becomes greater as the drive speed becomes greater when the drive speed is a positive value and the discharge amount in a reverse direction becomes greater as the drive speed becomes smaller when the drive speed is a negative value. The radiator side cooling water pump is arranged in the radiator inflow passage so that an outlet thereof when the discharge direction is the forward direction faces the radiator or is arranged in the radiator outflow passage so that an inlet thereof when the discharge direction is the forward direction faces the radiator. A controller is provided that is configured to control the stack side cooling water pump and the radiator side cooling water pump, respectively, to thereby control an amount of the cooling water flowing through the stack side cooling water passage, an amount of the cooling water flowing through the radiator side cooling water passage, and a direction and amount of the cooling water flowing through the bypass cooling water passage, respectively.

According to still another embodiment of the present invention, there is provided a method of control of a fuel cell system, the fuel cell system includes a fuel cell stack configured to generate electric power by an electrochemical reaction between fuel gas and an oxidizing gas; a radiator configured to lower a temperature of a cooling water for the fuel cell stack; a cooling water feed passage connecting an outlet of an in-radiator cooling water passage in the radiator and an inlet of an in-stack cooling water passage in the fuel cell stack with each other and a cooling water discharge passage connecting an outlet of the in-stack cooling water passage and an inlet of the in-radiator cooling water passage with each other. The cooling water feed passage includes a feed side branching point, a radiator outflow passage from the outlet of the in-radiator cooling water passage to the feed side branching point, and a stack inflow passage from the feed side branching point to the inlet of the in-stack cooling water passage. The cooling water discharge passage includes a discharge side branching point, a stack outflow passage from the outlet of the in-stack cooling water passage to the discharge side branching point, and a radiator inflow passage from the discharge side branching point to the inlet of the in-radiator cooling water passage, the stack inflow passage, the in-stack cooling water passage, and the stack outflow passage configure a stack side cooling water passage, and the radiator inflow passage, the in-radiator cooling water passage, and the radiator outflow passage configure a radiator side cooling water passage. A bypass cooling water passage is provided connecting the feed side branching point and the discharge side branching point with each other, through which the cooling water can flow between the feed side branching point and the discharge side branching point in both directions. A stack side cooling water pump is provided that is formed from a rotary pump able to change a direction and amount of the cooling water discharged by a change of a drive speed thereof, the stack side cooling water pump having a property that a discharge amount in a forward direction becomes greater as the drive speed becomes greater when the drive speed is a positive value and the discharge amount in a reverse direction becomes greater as the drive speed becomes smaller when the drive speed is a negative value, the stack side cooling water pump is arranged in the stack inflow passage so that an outlet thereof when the discharge direction is the forward direction faces the fuel cell stack or is arranged in the stack outflow passage so that an inlet thereof when the discharge direction is the forward direction faces the fuel cell stack. A radiator side cooling water pump is provided that is formed from a rotary pump able to change a direction and amount of the cooling water discharged by a change of a drive speed thereof, the radiator side cooling water pump having a property that a discharge amount in a forward direction becomes greater as the drive speed becomes greater when the drive speed is a positive value and the discharge amount in a reverse direction becomes greater as the drive speed becomes smaller when the drive speed is a negative value, the radiator side cooling water pump being arranged in the radiator inflow passage so that an outlet thereof when the discharge direction is the forward direction faces the radiator or being arranged in the radiator outflow passage so that an inlet thereof when the discharge direction is the forward direction faces the radiator. A controller is provided that is configured to control the stack side cooling water pump and the radiator side cooling water pump, respectively, wherein the method is configured to control the stack side cooling water pump and the radiator side cooling water pump by the controller, respectively, to thereby control an amount of the cooling water flowing through the stack side cooling water passage, an amount of the cooling water flowing through the radiator side cooling water passage, and a direction and amount of the cooling water flowing through the bypass cooling water passage, respectively.

DESCRIPTION OF THE PREFERRED EMBODIMENTS

Figure 1:
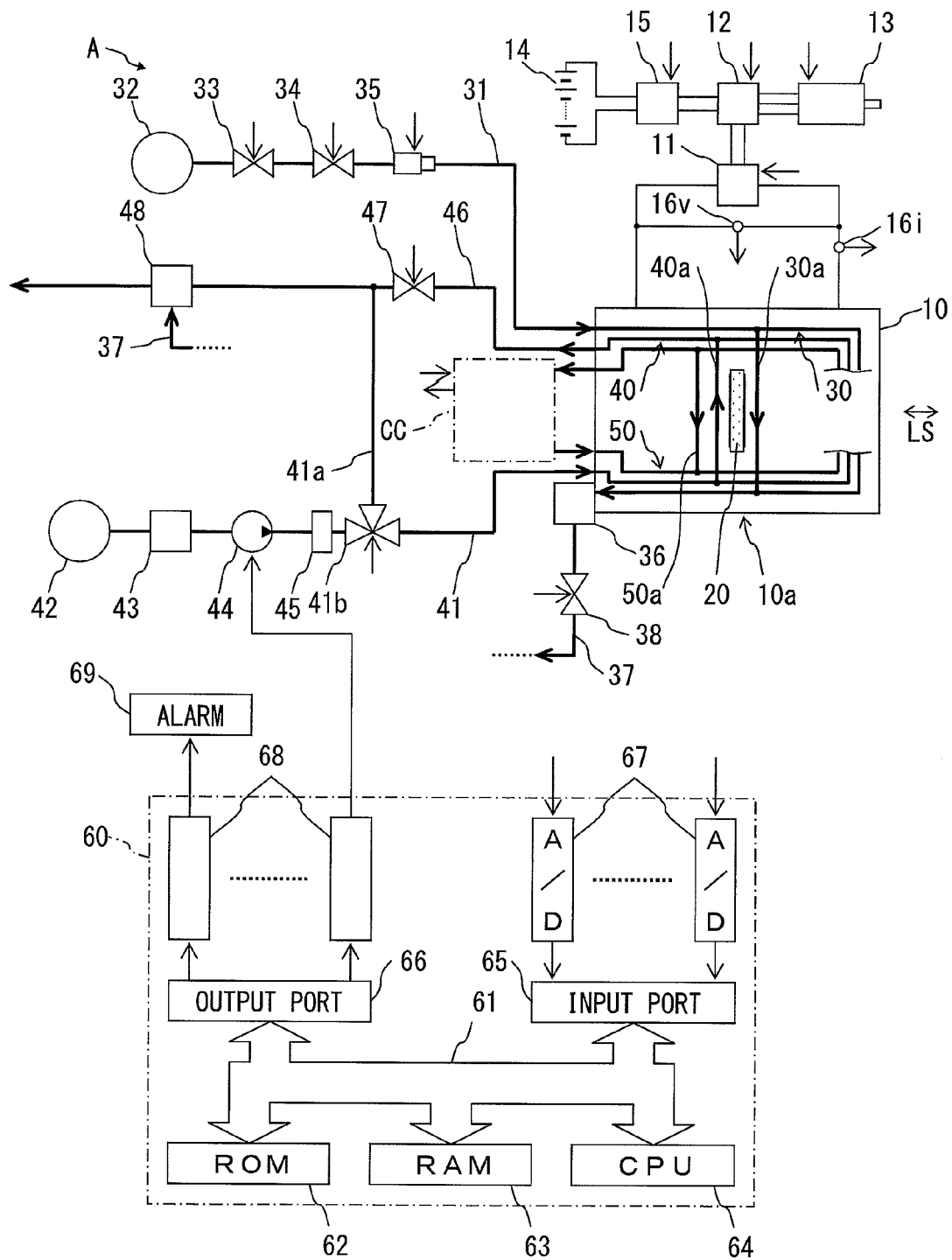
FIG. 1 is an overall view of a fuel cell system.

Referring to FIG. 1, a fuel cell system A is provided with a fuel cell stack 10. The fuel cell stack 10 is provided with a plurality of fuel cell unit cells 10a which are stacked with each other along a stacking direction LS. Each fuel cell unit cell 10a includes a membrane electrode assembly 20. The membrane electrode assembly 20 is provided with a membrane shaped electrolyte, an anode formed on one side of the electrolyte, and a cathode formed on the other side of the electrolyte.

The anodes and cathodes of the fuel cell unit cells 10a are electrically connected in series. The outermost anode and cathode in the stacking direction LS form electrodes of the fuel cell stack 10. The electrodes of the fuel cell stack 10 are electrically connected through a DC/DC converter 11 to an inverter 12, while the inverter 12 is electrically connected to a motor-generator 13. Further, the fuel cell system A is provided with an electric accumulator 14. This electric accumulator 14 is electrically connected through a DC/DC converter 15 to the above-mentioned inverter 12. The DC/DC converter 11 is for raising the voltage from the fuel cell stack 10 and sending it to the inverter 12, while the inverter 12 is for converting the DC current from the DC/DC converter 11 or electric accumulator 14 to AC current. The DC/DC converter 15 is for lowering the voltage from the fuel cell stack 10 or motor-generator 13 to the electric accumulator 14 or raising the voltage from the electric accumulator 14 to the motor-generator 13. Note that, in the fuel cell system A shown in FIG. 1, the electric accumulator 14 is comprised of a battery.

Further, in each fuel cell unit cell 10a, a hydrogen gas flow path 30a for feeding the anode a fuel gas constituted by hydrogen gas and an air flow path 40a feeding the cathode an oxidizing gas constituted by the air are formed. Between each two adjoining fuel cell unit cells 10a, a cooling water flow path 50a for feeding cooling water to the fuel cell unit cells 10a is formed. By connecting in parallel the hydrogen gas flow paths 30a, air flow paths 40a, and cooling water flow paths 50a of the plurality of fuel cell unit cells 10a, respectively, a hydrogen gas passage 30, air passage 40, and cooling water passage 50 are formed in the fuel cell stack 10. In the fuel cell system A shown in FIG. 1, inlets and outlets of the hydrogen gas passage 30, air passage 40, and cooling water passage 50 are respectively arranged at a single end of the fuel cell stack 10 in the stacking direction LS.

Referring to a center axis of the fuel cell stack 10 extending in the stacking direction LS as a "stack center axis", in the fuel cell system A shown in FIG. 1, the inlets of the hydrogen gas flow paths 30a and the outlets of the air flow paths 40a are arranged at one side of the stack center axis, while the outlets of the hydrogen gas flow paths 30a and the inlets of the air flow paths 40a are arranged at the other side of the stack center axis. Therefore, the direction of the hydrogen gas flowing through the hydrogen gas flow paths 30a and the direction of the air flowing through the air flow paths 40a are substantially opposite from each other. That is, the fuel cell stack 10 is comprised of a fuel cell stack of a counter flow type. In another embodiment (not shown), the inlets of the hydrogen gas flow paths 30a and the inlets of the air flow paths 40a are arranged on one side of the stack center axis, while the outlets of the hydrogen gas flow paths 30a and the outlets of the air flow paths 40a are arranged on the other side of the stack center axis. Therefore, the direction of the hydrogen gas flowing through the hydrogen gas flow paths 30a and the direction of the air flowing through the air flow paths 40a are substantially the same as each other. That is, in this other embodiment (not shown), the fuel cell stack 10 is comprised of a fuel cell stack of a parallel flow type.

A hydrogen gas feed pipe 31 is connected with the inlet of the hydrogen gas passage 30. The hydrogen gas feed pipe 31 is connected with a hydrogen gas source, for example, a hydrogen tank 32. In order from the upstream side, an electromagnetic type shutoff valve 33, a regulator 34 adjusting a pressure in the hydrogen gas feed pipe 31, and a hydrogen gas feeder 35 for feeding hydrogen gas from the hydrogen gas source 32 to the fuel cell stack 10 are arranged in the hydrogen gas feed pipe 31. In the fuel cell system A shown in FIG. 1, the hydrogen gas feeder 35 is comprised of an electromagnetic type hydrogen gas feed valve. This hydrogen gas feed valve is provided with a needle valve, therefore hydrogen gas is intermittently fed from the hydrogen gas feed valve. On the other hand, a purge pipe 37 is connected with the outlet of the hydrogen gas passage 30 through a buffer tank 36. An electromagnetic type purge control valve 38 is arranged in the purge pipe 37. If the shutoff valve 33 and hydrogen gas feed valve 35 are opened, the hydrogen gas in the hydrogen tank 32 is fed through the hydrogen gas feed pipe 31 to the hydrogen gas passage 30 in the fuel cell stack 10. The gas flowing out from the hydrogen gas passage 30 at this time, that is, an anode off-gas, flows to the buffer tank 36 and is accumulated in the buffer tank 36. The purge control valve 38 is normally closed and is periodically opened for short times. If the purge control valve 38 is opened, the anode off-gas in the buffer tank 36 is discharged through the purge pipe 37 into the atmosphere, that is, purging is performed.

In the fuel cell system A shown in FIG. 1, the outlet of the purge pipe 37 is communicated with the atmosphere. That is, the outlet of the hydrogen gas passage 30 is not communicated with the hydrogen gas feed pipe 31, therefore it is separated from the hydrogen gas feed pipe 31. This means that the anode off-gas flowing out from the outlet of the hydrogen gas passage 30 will not be returned to the hydrogen gas feed pipe 31. In other words, the fuel cell system A shown in FIG. 1 is of a hydrogen gas non-circulating type. In another embodiment (not shown), the outlet of the hydrogen gas passage 30 is connected through a hydrogen gas return pipe to, for example, the hydrogen gas feed pipe 31 between the regulator 34 and the hydrogen gas feed valve 35. In order from the upstream side, a gas-liquid separator and a hydrogen gas return pump which sends the hydrogen gas separated by the gas-liquid separator to the hydrogen gas feed pipe 31 are arranged in the hydrogen gas return pipe. In this case, the anode off-gas containing the hydrogen gas is returned through the hydrogen gas return pipe to the hydrogen gas feed pipe 31. As a result, a mixture of the hydrogen gas from the hydrogen gas source 32 and the hydrogen gas from the hydrogen gas return pipe is fed from the hydrogen gas feed valve 35 to the fuel cell stack 10. That is, in this other embodiment (not shown), the fuel cell system A is of a hydrogen gas circulating type. In comparison with this other embodiment (not shown), in the fuel cell system A shown in FIG. 1, the hydrogen gas return pipe, hydrogen gas return pump, etc. are omitted. As a result, in the fuel cell system A shown in FIG. 1, the configuration is simplified, the cost is decreased, and space for the hydrogen gas return pipe etc. is not required.

Further, an air feed pipe 41 is connected with the inlet of the air passage 40. The air feed pipe 41 is connected with an air source, for example, the atmosphere 42. In order from the upstream side, an air cleaner 43, compressor 44 pumping the air, and intercooler 45 for cooling the air sent from the compressor 44 to the fuel cell stack 10 are arranged in the air feed pipe 41. On the other hand, a cathode off-gas pipe 46 is connected with the outlet of the air passage 40. When the compressor 44 is driven, air is fed through the air feed pipe 41 to the air passage 40 in the fuel cell stack 10. The gas flowing out from the air passage 40 at this time, that is, a cathode off-gas, flows into the cathode off-gas pipe 46. In order from the upstream side, an electromagnetic type cathode pressure control valve 47 for controlling a pressure in the air passage 40, that is, a cathode pressure, and a diluter 48 are arranged in the cathode off-gas pipe 46. The above-mentioned purge pipe 37 is connected with this diluter 48. As a result, the hydrogen gas in the purge gas from the purge pipe 37 is diluted by the cathode off-gas. In the fuel cell system A shown in FIG. 1, further, a bypass pipe 41a branching off from the air feed pipe 41 downstream of the intercooler 45 and reaching the cathode off-gas pipe 46 downstream of the cathode pressure control valve 47 and a bypass control valve 41b controlling an amount of air discharged from the compressor 44 and fed to the fuel cell stack 10 and an amount of air discharged from the compressor 44 and flowing into the bypass pipe 41a are provided.

Figure 2:
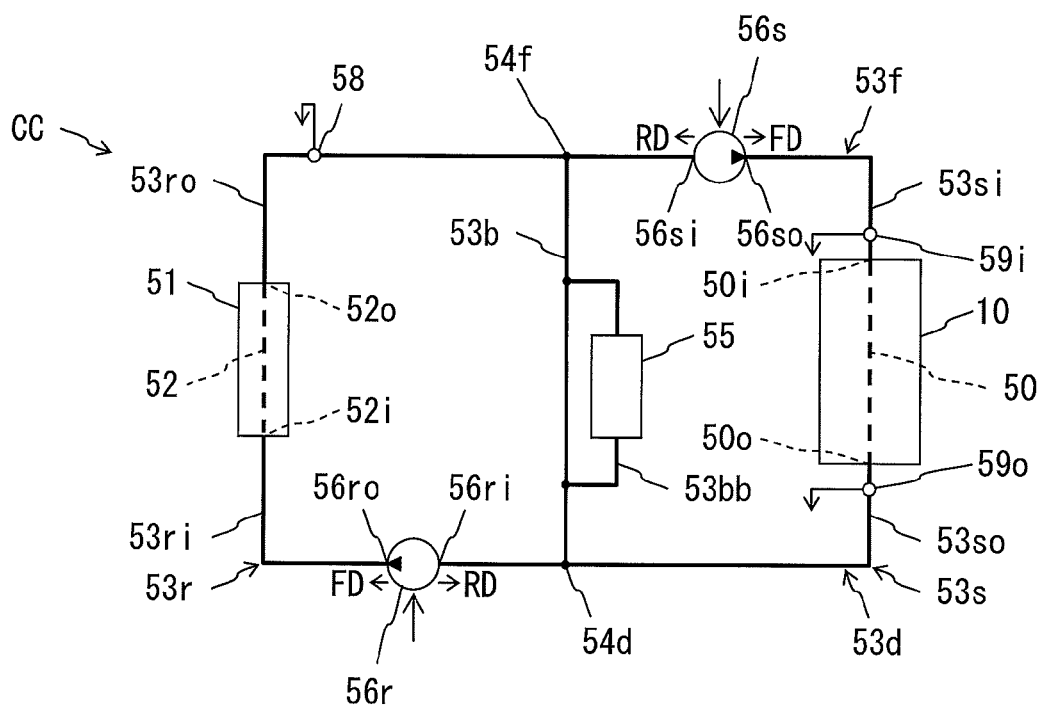
FIG. 2 is a schematic view of a cooling circuit.

A cooling circuit CC is connected with the inlet and the outlet of the cooling water passage 50 in the above-mentioned fuel cell stack 10. Referring to FIG. 2, the cooling circuit CC is provided with a radiator 51 configured to lower a temperature of the cooling water. An in-radiator cooling water passage 52 is formed in the radiator 51, through which the cooling water flows. Referring to the cooling water passage 50 in the fuel cell stack 10 as an in-stack cooling water passage, an outlet 52o of the in-radiator cooling water passage 52 and an inlet 50i of the in-stack cooling water passage 50 are connected with each other by a cooling water feed passage 53f. The cooling water feed passage 53f is provided with a radiator outflow passage 53ro from the outlet 52o of the in-radiator cooling water passage 52 to a feed side branching point 54f and a stack inflow passage 53si from the feed side branching point 54f to the inlet 50i of the in-stack cooling water passage 50. Further, an outlet 50o of the in-stack cooling water passage 50 and an inlet 52i of the in-radiator cooling water passage 52 are connected with each other by a cooling water discharge passage 53d. The cooling water discharge passage 53d is provided with a stack outflow passage 53so from the outlet 50o of the in-stack cooling water passage 50 to a discharge side branching point 54d and a radiator inflow passage 53ri from the discharge side branching point 54d to the inlet 52i of the in-radiator cooling water passage 52.

The feed side branching point 54f of the cooling water feed passage 53f and the discharge side branching point 54d of the cooling water discharge passage 53d are connected with each other by a bypass cooling water passage 53b. The bypass cooling water passage 53b is provided with a branch passage 53bb branching from the bypass cooling water passage 53b and returning to the bypass cooling water passage 53b. A deionizer 55 configured to remove ions in the cooling water is arranged in this branch passage 53bb. Therefore, part of the cooling water flowing into the bypass cooling water passage 53b flows through the deionizer 55 and ions in the cooling water flowing through the deionizer 55 are removed. Further, no check valve is provided in the bypass cooling water passage 53b. Therefore, the cooling water can flow between the feed side branching point 54f and the discharge side branching point 54d in both directions. Note that no cooling water pump is provided in the bypass cooling water passage 53b.

The cooling circuit CC is further provided with two cooling water pumps, that is, a stack side cooling water pump 56s and a radiator side cooling water pump 56r. The stack side cooling water pump 56s and the radiator side cooling water pump 56r are respectively comprised of rotary pumps able to change directions and amounts of cooling water discharged by changes of drive speeds thereof. As the rotary pumps, for example, gear pumps, or eccentric pumps such as vane pumps, or screw pumps may be used. In the embodiment shown in FIG. 2, the stack side cooling water pump 56s is arranged in the stack inflow passage 53si so that an inlet 56si thereof when the discharge direction is a forward direction FD faces the radiator 51 and so that an outlet 56so thereof when the discharge direction is the forward direction FD faces the fuel cell stack 10, while the radiator side cooling water pump 56r is arranged in the radiator inflow passage 53ri so that an inlet 56ri thereof when the discharge direction is a forward direction FD faces the fuel cell stack and so that an outlet 56ro thereof when the discharge direction is the forward direction FD faces the radiator 51. In another embodiment (not shown), the stack side cooling water pump 56s is arranged in the stack outflow passage 53so so that the inlet 56si when the discharge direction is the forward direction FD faces the fuel cell stack 10 and so that the outlet 56so when the discharge direction is the forward direction FD faces the radiator 51. Further, in still another embodiment (not shown), the radiator side cooling water pump 56r is arranged in the radiator outflow passage 53ro so that the inlet 56ri when the discharge direction is the forward direction FD faces the radiator 51 and so that the outlet 56ro when the discharge direction is the forward direction FD faces the fuel cell stack 10. The inlets 56si, 56ri and the outlets 56so, 56ro when the discharge direction is the forward direction FD act as the outlets and inlets when the discharge direction is a reverse direction RD.

While details will be explained later, considering that cooling water passages positioned at a side of the fuel cell stack 10 with respect to the bypass cooling water passage 53b, that is, the stack inflow passage 53si, in-stack cooling water passage 50, and stack outflow passage 53so, form a stack side cooling water passage 53s and cooling water passages positioned at a side of the radiator 51 with respect to the bypass cooling water passage 53b, that is, the radiator inflow passage 53ri, in-radiator cooling water passage 52, and radiator outflow passage 53ro, form a radiator side cooling water passage 53r, in the embodiment shown in FIG. 1 and FIG. 2, a drive speed of the stack side cooling water pump 56s and a drive speed of the radiator side cooling water pump 56r are respectively controlled to thereby control an amount of the cooling water flowing through the stack side cooling water passage 53s, an amount of the cooling water flowing through the radiator side cooling water passage 53r, and a direction and amount of the cooling water flowing through the bypass cooling water passage 53b, respectively. Note that, in the embodiment shown in FIG. 1 and FIG. 2, the stack side cooling water passage 53s and radiator side cooling water passage 53r are formed so that a pressure loss of the stack side cooling water passage 53s and a pressure loss of the radiator side cooling water passage 53r are substantially equal to each other. Further, the stack side cooling water pump 56s and the radiator side cooling water pump 56r are configured from the mutually same pumps.

Therefore, in the embodiment shown in FIG. 1 and FIG. 2, a cooling water passage bypassing the fuel cell stack 10 and radiator 51 and connecting the cooling water feed passage 53f and the cooling water discharge passage 53d with each other is comprised of the bypass cooling water passage 53b only. As a result, a configuration of the cooling circuit CC can be simplified. On the other hand, in the embodiment shown in FIG. 1 and FIG. 2, the cooling water pumps making the cooling water flow are comprised of the stack side cooling water pump 56s and the radiator side cooling water pump 56r. As a result, the cooling water pumps 56s, 56r can be downsized.

An electrical conductivity sensor 58 configured to detect an electrical conductivity of the cooling water in the radiator outflow passage 53ro is arranged in the radiator outflow passage 53ro. Further, a temperature sensor 59i configured to detect a temperature of the cooling water in the stack inflow passage 53si is arranged in the stack inflow passage 53si, while a temperature sensor 59o configured to detect a temperature of the cooling water in the stack outflow passage 53so is arranged in the stack outflow passage 53so. The temperature of the cooling water in the stack outflow passage 53so indicates a temperature of the fuel cell stack 10, that is, a "stack temperature".

In the embodiment shown in FIG. 1 and FIG. 2, if a signal to start power generation in the fuel cell stack 10 is issued, at least one of the stack side cooling water pump 56s and the radiator side cooling water pump 56r is actuated, whereby the cooling water is made to flow through the in-stack cooling water passage 50 of the fuel cell stack 10 and, therefore, the fuel cell stack 10 is cooled. The signal to start power generation in the fuel cell stack 10 is, for example, issued by an operator of the electric vehicle operating a start switch (not shown).

Referring again to FIG. 1, an electronic control unit or controller 60 is comprised of a digital computer provided with components connected with each other by a bidirectional bus 61 such as a ROM (read only memory) 62, RAM (random access memory) 63, CPU (microprocessor) 64, input port 65, and output port 66. The fuel cell stack 10 is provided with a voltmeter 16v and ammeter 16i detecting output voltage and output current of the fuel cell stack 10. Output signals of the voltmeter 16v, ammeter 16i, electrical conductivity sensor 58 (FIG. 2), and temperature sensors 59i, 59o (FIG. 2) are input through corresponding AD converters 67 to the input port 65. On the other hand, the output port 66 is electrically connected through corresponding drive circuits 68 to the DC/DC converter 11, inverter 12, motor-generator 13, DC/DC converter 15, shutoff valve 33, regulator 34, hydrogen gas feed valve 35, purge control valve 38, bypass control valve 41b, compressor 44, cathode pressure control valve 47, stack side cooling water pump 56s (FIG. 2), radiator side cooling water pump 56r (FIG. 2), and alarm 69. The alarm 69 is actuated when it is difficult to lower the electrical conductivity of the cooling water.

When the fuel cell stack 10 is to be started up, that is, when power generation in the fuel cell stack 10 is to be started, the shutoff valve 33 and the hydrogen gas feed valve 35 are opened and hydrogen gas is fed to the fuel cell stack 10. Further, the compressor 44 is driven, and air is fed to the fuel cell stack 10. As a result, in the fuel cell stack 10, electrochemical reactions ($H_2 \rightarrow 2H^+ + 2e^-$, $(\frac{1}{2})O_2 + 2H^+ + 2e^- \rightarrow H_2O$) occur and electrical energy is generated. The electrical energy generated is sent to the motor-generator 13. As a result, the motor-generator 13 is operated as an electric motor for driving a vehicle whereby the vehicle is driven. On the other hand, for example, when braking the vehicle, the motor-generator 13 is operated as a recovery device. The electrical energy recovered at this time is stored in the electric accumulator 14.

As explained above, the stack side cooling water pump 56s and the radiator side cooling water pump 56r both have the properties of being able to change the directions and amounts of the cooling water discharged by changes of the drive speeds thereof. Next, the properties of the stack side cooling water pump 56s and the radiator side cooling water pump 56r will be explained, taking the stack side cooling water pump 56s as an example.

Figure 3:
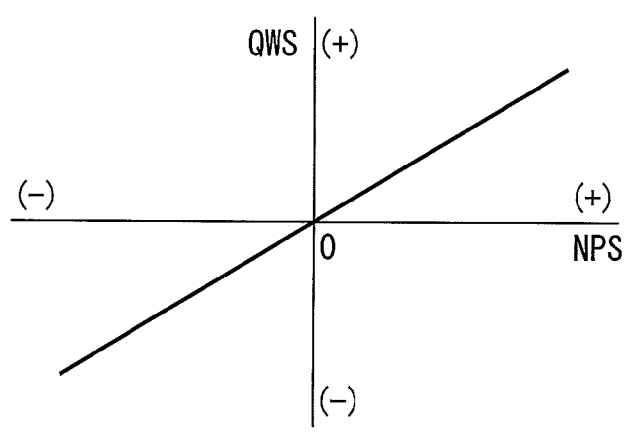
FIG. 3 is a graph showing a general property of a stack side cooling water pump.

FIG. 3 shows a change in an amount of the cooling water discharged from the stack side cooling water pump 56s, that is, a change in an amount of cooling water QWS flowing through the stack side cooling water passage 53s, when the drive speed NPS of the stack side cooling water pump 56s is made to change while the radiator side cooling water pump 56r is stopped. Note that the discharge amount QWS of the stack side cooling water pump 56s indicates an amount of cooling water flowing in the forward direction FD if it is a positive value, and indicates an amount of cooling water flowing in the reverse direction RD if it is a negative value. Referring to FIG. 3, if the drive speed NPS of the stack side cooling water pump 56s is a positive value, the discharge amount QWS of the stack side cooling water pump 56s is a positive value. In other words, the cooling water is discharged through the outlet 56so in the forward direction FD. Further, the greater the drive speed NPS becomes, the greater the discharge amount in the forward direction FD. As opposed to this, if the drive speed NPS of the stack side cooling water pump 56s is a negative value, the discharge amount QWS of the stack side cooling water pump 56s is a negative value. In other words, the cooling water is discharged through the inlet 56si in the reverse direction RD. Further, as the drive speed NPS becomes smaller, the discharge amount in the reverse direction RD becomes greater. If the drive speed NPS of the stack side cooling water pump 56s is zero, the discharge amount QWS of the stack side cooling water pump 56s is zero.

The property of the stack side cooling water pump 56s when the radiator side cooling water pump 56r is stopped, as shown in FIG. 3, may be considered a property of the stack side cooling water pump 56s when only the stack side cooling water pump 56s is arranged at the cooling circuit CC and may be considered a general property of the stack side cooling water pump 56s.

In this regard, if the radiator side cooling water pump 56r is driven, the property of the stack side cooling water pump 56s becomes different from the general property shown in FIG. 3. This will be explained with reference to FIG. 4.

Figure 4:
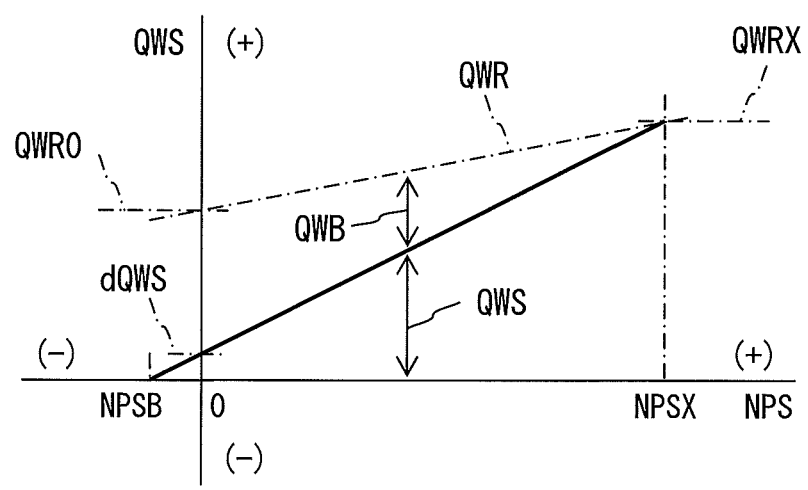
FIG. 4 is a graph showing a property of a stack side cooling water pump when a radiator side cooling water pump is being driven.

FIG. 4 shows a change in a discharge amount of the stack side cooling water pump 56s, that is, a change in an amount of cooling water QWS flowing through the stack side cooling water passage 53*s* and a change in an amount of cooling water QWB flowing through the bypass cooling water passage 53*b*, when maintaining the drive speed NPR of the radiator side cooling water pump 56*r* at a constant value NPRX (>0) while changing the drive speed NPS of the stack side cooling water pump 56*s*. In FIG. 4, an amount of the cooling water discharged from the radiator side cooling water pump 56*r*, that is, an amount of the cooling water flowing through the radiator side cooling water passage 53*r* with the drive speed NPR of the radiator side cooling water pump 56*r* being a constant value NPRX, is shown by QWR (>0). Details will be explained later, but the discharge amount QWR of the radiator side cooling water pump 56*r* when the drive speed NPR of the radiator side cooling water pump 56*r* is maintained constant depends upon the drive speed NPS of the stack side cooling water pump 56*s* or the discharge amount QWS of the stack side cooling water pump 56*s*. Specifically, it becomes smaller as the drive speed NPS of the stack side cooling water pump 56*s* becomes smaller. In the example shown in FIG. 4, the discharge amount QWR of the radiator side cooling water pump 56*r* becomes an amount QWRX if the drive speed NPS of the stack side cooling water pump 56*s* is set to a positive value NPSX and becomes an amount QWR0 if the drive speed NPS of the stack side cooling water pump 56*s* is set to zero.

Referring to FIG. 4, when the drive speed NPS of the stack side cooling water pump 56*s* is set to the positive value NPSX, the discharge amount QWS of the stack side cooling water pump 56*s* is substantially equal to the discharge amount QWR or QWRX of the radiator side cooling water pump 56*r*. In other words, the amount of cooling water flowing through the stack side cooling water passage 53*s* is substantially equal to the amount of cooling water flowing through the radiator side cooling water passage 53*r*. Further, in other words, at the feed side branching point 54*f*, substantially all of the cooling water flowing through the radiator side cooling water passage 53*r* flows into the stack side cooling water passage 53*s*, therefore an insignificant amount of the cooling water flows through the bypass cooling water passage 53*b*. That is, the amount of cooling water QWB flowing through the bypass cooling water passage 53*b* is substantially zero. In this case, the cooling water flows through the stack side cooling water passage 53*s* and the radiator side cooling water passage 53*r* while it hardly flows through the bypass cooling water passage 53*b*. If the above-mentioned positive value NPSX is referred to as a "bypass-less speed" of the stack side cooling water pump 56*s*, the bypass-less speed NPSX of the stack side cooling water pump 56*s* is determined by the drive speed NPRX of the radiator side cooling water pump 56*r*. In the embodiment shown in FIG. 1 and FIG. 2, the bypass-less speed NPSX of the stack side cooling water pump 56*s* is equal to the drive speed NPRX of the radiator side cooling water pump 56*r*.

If the drive speed NPS of the stack side cooling water pump 56*s* is made smaller from the bypass-less speed NPSX of the stack side cooling water pump 56*s*, the discharge amount QWS of the stack side cooling water pump 56*s* is decreased from the discharge amount QWR of the radiator side cooling water pump 56*r*. In other words, the amount of cooling water flowing through the stack side cooling water passage 53*s* becomes smaller than the amount of cooling water flowing through the radiator side cooling water passage 53*r*. This is because, at the feed side branching point 54*f*, part of the cooling water having flowed through the radiator side cooling water passage 53*r* flows into the stack side cooling water passage 53*s* and the remainder flows into the bypass cooling water passage 53*b*. In this case, as the drive speed NPS of the stack side cooling water pump 56*s* becomes smaller, the amount of cooling water QWS flowing through the stack side cooling water passage 53*s* is decreased and the amount of cooling water QWB flowing through the bypass cooling water passage 53*b* is increased.

Even if the drive speed NPS of the stack side cooling water pump 56*s* is reduced to zero, that is, even if the stack side cooling water pump 56*s* is stopped, the discharge amount QWS of the stack side cooling water pump 56*s* does not become zero but becomes a relatively small positive value dQWS. In other words, even if the stack side cooling water pump 56*s* is stopped, the cooling water flows by an amount dQWS through the stack side cooling water passage 53*s*. This is because, even if the drive speed NPS of the stack side cooling water pump 56*s* is zero, the cooling water flows between impellers and a casing of the stack side cooling water pump 56*s* or between the impellers to pass through the stack side cooling water pump 56*s*, and flows out from the outlet 56*so* of the stack side cooling water pump 56*s*. Note that in this specification, an amount of the cooling water thus passing through the stack side cooling water pump 56*s* is also considered the discharge amount QWS of the stack side cooling water pump 56*s*, while an amount of the cooling water passing through the radiator side cooling water pump 56*r* is also considered the discharge amount QWR of the radiator side cooling water pump 56*r*.

Here, comparing FIG. 3 and FIG. 4, it is also possible to consider that the discharge amount QWS of the stack side cooling water pump 56*s* when the radiator side cooling water pump 56*r* is driven is increased with respect to that when the radiator side cooling water pump 56*r* is not driven. An increment of the discharge amount of the stack side cooling water pump 56*s* at this time becomes greater as the drive speed NPR of the radiator side cooling water pump 56*r* becomes greater. Similarly, the discharge amount QWR of the radiator side cooling water pump 56*r* when the stack side cooling water pump 56*s* is driven is increased with respect to that when the stack side cooling water pump 56*s* is not driven. An increment of the discharge amount of the radiator side cooling water pump 56*r* at this time becomes greater as the drive speed NPS of the stack side cooling water pump 56*s* becomes greater. For this reason, the discharge amount QWR of the radiator side cooling water pump 56*r* shown in FIG. 4, as explained above, becomes smaller as the drive speed NPS of the stack side cooling water pump 56*s* becomes smaller.

Further, referring to FIG. 4, if the drive speed NPS of the stack side cooling water pump 56*s* is made further smaller than zero, that is, if the stack side cooling water pump 56*s* is driven in the reverse direction, the discharge amount QWS of the stack side cooling water pump 56*s* is further decreased from the above-mentioned amount dQWS. In this case, as the drive speed NPS of the stack side cooling water pump 56*s* becomes smaller, that is, as the reverse directional drive speed (absolute value) of the stack side cooling water pump 56*s* becomes greater, the discharge amount QWS of the stack side cooling water pump 56*s* becomes smaller. Next, if the drive speed NPS of the stack side cooling water pump 56*s* becomes a stack bypass speed NPSB (<0), the discharge amount QWS of the stack side cooling water pump 56*s* becomes substantially zero. In other words, the amount of cooling water flowing through the stack side cooling water passage 53*s* becomes substantially zero. Further, in other words, at the feed side branching point 54*f*, substantially all of the cooling water flowing through the radiator side cooling water passage 53*r* flows into the bypass cooling water passage 53*b*, while it hardly flows into the stack side cooling water passage 53s. This is because, if viewed closely, the amount of cooling water flowing through the inlet 56si into the stack side cooling water pump 56s and the amount of cooling water flowing through the inlet 56si out from the stack side cooling water pump 56s are substantially balanced.

The above-mentioned stack bypass speed NPSB depends on the drive speed NPRX of the radiator side cooling water pump 56r and becomes smaller as the drive speed NPRX of the radiator side cooling water pump 56r becomes greater. When the radiator side cooling water pump 56r is stopped, that is, when the drive speed NPR of the radiator side cooling water pump 56r is set to zero, the stack bypass speed NPSB becomes zero. This corresponds to the case shown in FIG. 3.

Figure 5A:
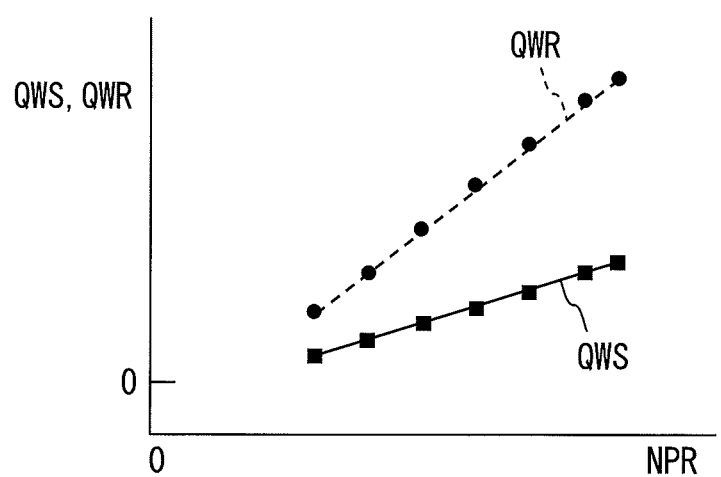
FIG. 5A is a view showing experimental results.

This is verified by experiments. FIG. 5A gives experimental results showing the discharge amount QWS of the stack side cooling water pump 56s and the discharge amount QWR of the radiator side cooling water pump 56r when stopping the stack side cooling water pump 56s while making the drive speed NPR of the radiator side cooling water pump 56r change. As shown in FIG. 5A, as the drive speed NPR of the radiator side cooling water pump 56r becomes greater, the amount of the cooling water discharged QWR from the radiator side cooling water pump 56r increases and the amount of the cooling water discharged QWS from the stack side cooling water pump 56s, that is, the amount QWS of the cooling water which passes through the stack side cooling water pump 56s, increases.

Figure 5B:
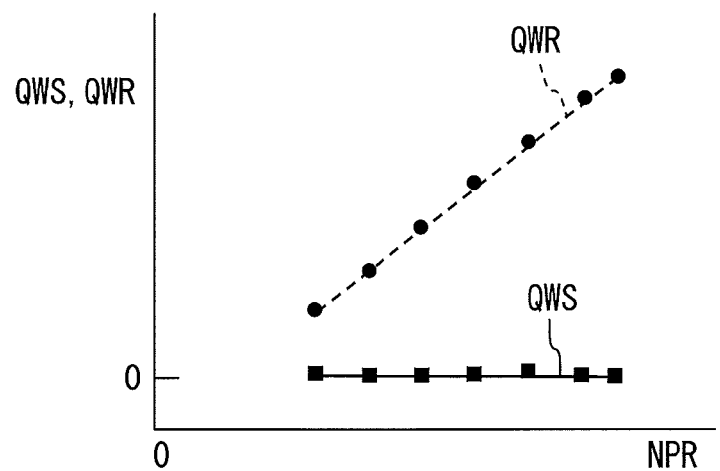
FIG. 5B is a view showing experimental results.

As opposed to this, FIG. 5B shows results of experiments which show the discharge amount QWS of the stack side cooling water pump 56s and the discharge amount QWR of the radiator side cooling water pump 56r when maintaining the drive speed NPS of the stack side cooling water pump 56s at the above-mentioned stack bypass speed NPSB while changing the drive speed NPR of the radiator side cooling water pump 56r. As will be understood from FIG. 5B, as the drive speed NPR of the radiator side cooling water pump 56r becomes greater, the amount of the cooling water discharged QWR from the radiator side cooling water pump 56r increases. However, the amount of the cooling water QWS discharged from the stack side cooling water pump 56s, that is, the amount of cooling water QWS passing through the stack side cooling water pump 56s, is maintained at substantially zero.

The property of the radiator side cooling water pump 56r are similar to the property of the stack side cooling water pump 56s, so explanation will be omitted. Note that, below, a drive speed NPR of the radiator side cooling water pump 56r which makes almost no flow of the cooling water through the radiator side cooling water passage 53r when the drive speed NPS of the stack side cooling water pump 56s is set to a positive value is referred to as a "radiator bypass speed NPRB", while a drive speed NPS of the stack side cooling water pump 56s which makes almost no flow of the cooling water through the stack side cooling water passage 53s when the drive speed NPR of the radiator side cooling water pump 56r is controlled to a positive value is referred to as a "stack bypass speed NPSB". The radiator bypass speed NPRB is determined in accordance with the drive speed NPS of the stack side cooling water pump 56s, while the stack bypass speed NPSB is determined in accordance with the drive speed NPR of the radiator side cooling water pump 56r.

Now then, in the embodiment shown in FIG. 1 and FIG. 2, the cooling water can be run by various cooling water cooling mode operations. Below, these cooling water cooling mode operations will be explained in order.

Figure 6:
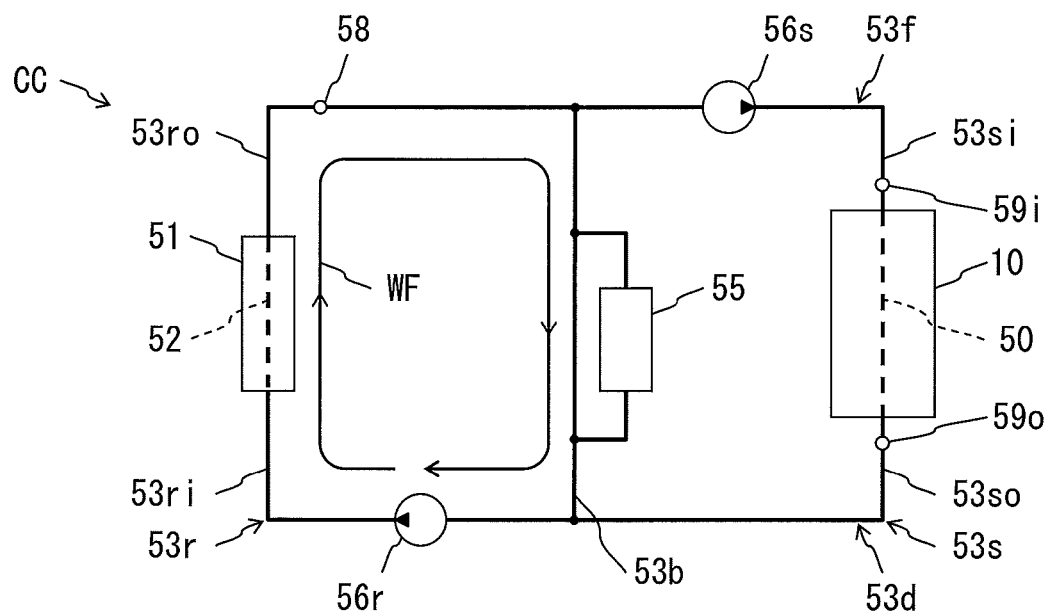
FIG. 6 is a schematic view of a cooling circuit explaining a stack full bypass mode operation.

In a stack full bypass mode operation shown in FIG. 6, the drive speed NPR of the radiator side cooling water pump 56r is set to a positive value. Further, the drive speed NPS of the stack side cooling water pump 56s is set to a negative value, specifically the stack bypass speed NPSB. As a result, as shown in FIG. 6 by the arrow WF, the cooling water circulates through the radiator side cooling water passage 53r and the bypass cooling water passage 53b while it hardly flows through the stack side cooling water passage 53s. That is, the cooling water flows through the radiator side cooling water passage 53r in the forward direction, flows through the bypass cooling water passage 53b from the cooling water feed passage 53f toward the cooling water discharge passage 53d, but hardly flows through the stack side cooling water passage 53s. Note that, in the stack full bypass mode operation, the amount of cooling water flowing through the stack side cooling water passage 53s is preferably zero.

Figure 7:
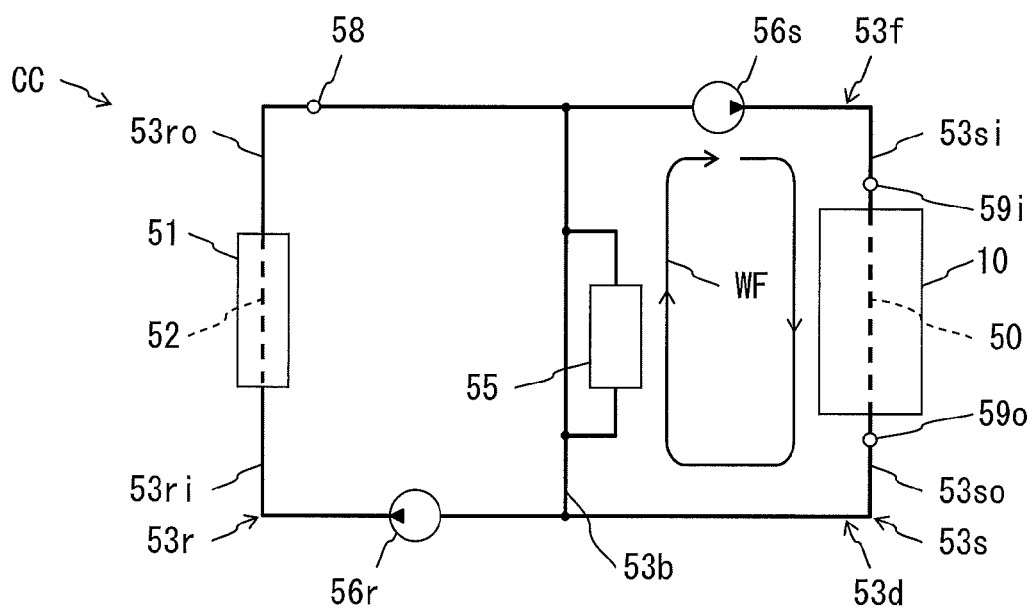
FIG. 7 is a schematic view of a cooling circuit explaining a radiator full bypass mode operation.

In a radiator full bypass mode operation shown in FIG. 7, the drive speed NPS of the stack side cooling water pump 56s is set to a positive value. Further, the drive speed NPR of the radiator side cooling water pump 56r is set to a negative value, specifically the radiator bypass speed NPRB. As a result, as shown in FIG. 7 by the arrow WF, the cooling water circulates through the stack side cooling water passage 53s and the bypass cooling water passage 53b while it hardly flows through the radiator side cooling water passage 53r. That is, the cooling water flows through the stack side cooling water passage 53s in the forward direction, flows through the bypass cooling water passage 53b from the cooling water discharge passage 53d toward the cooling water feed passage 53f, but hardly flows through the radiator side cooling water passage 53r. Note that, in the radiator full bypass mode operation, the amount of cooling water flowing through the radiator side cooling water passage 53r is preferably zero.

Figure 8:
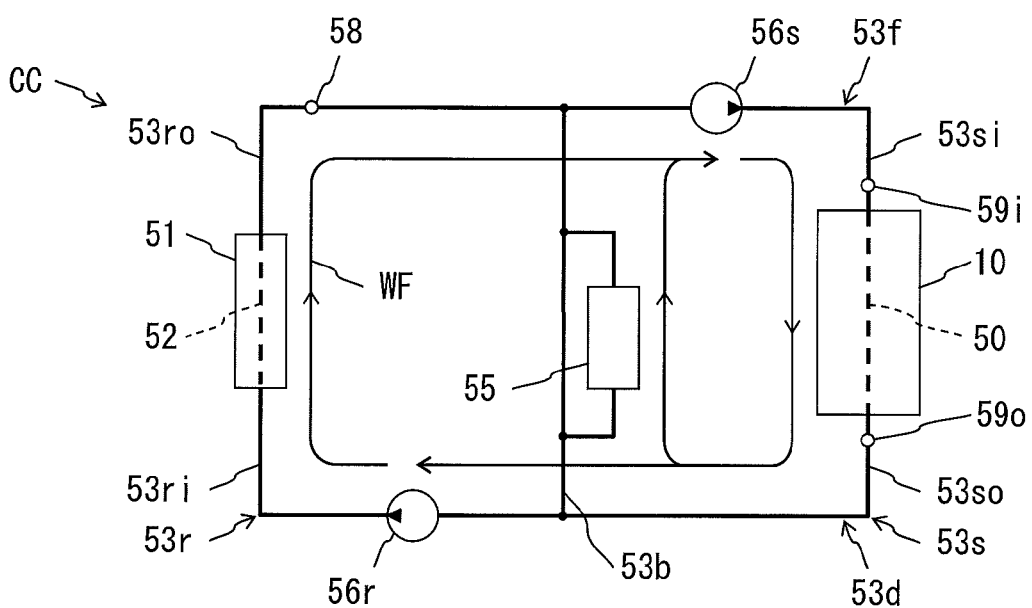
FIG. 8 is a schematic view of a cooling circuit explaining a radiator partial bypass mode operation.

In a radiator partial bypass mode operation shown in FIG. 8, the drive speed NPS of the stack side cooling water pump 56s is set to a positive value. Further, the drive speed NPR of the radiator side cooling water pump 56r is set to a positive value, zero, or a negative value which is greater than the radiator bypass speed NPRB. More specifically, the drive speed NPR of the radiator side cooling water pump 56r is set to a positive value, zero, or a negative value which is smaller than the bypass-less speed NPRX of the radiator side cooling water pump 56r and greater than the radiator bypass speed NPRB. In other words, the stack side cooling water pump 56s and the radiator side cooling water pump 56r are driven so that the discharge amount of the stack side cooling water pump 56s is greater than the discharge amount of the radiator side cooling water pump 56r. Note that, in the embodiment shown in FIG. 1 and FIG. 2, the bypass-less speed NPRX of the radiator side cooling water pump 56r matches the drive speed NPS of the stack side cooling water pump 56s. As a result, as shown in FIG. 8 by the arrow WF, the cooling water circulates through the stack side cooling water passage 53s and the bypass cooling water passage 53b while it flows through the radiator side cooling water passage 53r. That is, the cooling water flows through the stack side cooling water passage 53s in the forward direction, flows through the radiator side cooling water passage 53r in the forward direction, and flows through the bypass cooling water passage 53b from the cooling water discharge passage 53d toward the cooling water feed passage 53f. In this case, a part of the cooling water having flowed through the stack outflow passage 53so flows into the bypass cooling water passage 53*b* while the remainder flows into the radiator inflow passage 53*ri*. Further, the amount of cooling water flowing through the stack side cooling water passage 53*s* is a total of the amount of the cooling water flowing through the radiator side cooling water passage 53*r* and the amount of the cooling water flowing through the bypass cooling water passage 53*b*, therefore the amount of the cooling water flowing through the radiator side cooling water passage 53*r* is smaller than the amount of the cooling water flowing through the stack side cooling water passage 53*s*. Furthermore, if the drive speed NPR of the radiator side cooling water pump 56*r* is lowered toward the radiator bypass speed NPRB, a ratio of the amount of the cooling water flowing into the bypass cooling water passage 53*b* to the amount of the cooling water flowing through the stack outflow passage 53*so* is increased while a ratio of the amount of the cooling water flowing into the radiator inflow passage 53*ri* to the amount of the cooling water flowing through the stack outflow passage 53*so* is decreased. As opposed to this, if the drive speed NPR of the radiator side cooling water pump 56*r* is raised toward the bypass-less speed NPRX of the radiator side cooling water pump 56*r*, the ratio of the amount of the cooling water flowing into the bypass cooling water passage 53*b* to the amount of the cooling water flowing through the stack outflow passage 53*so* is decreased and a ratio of the amount of the cooling water flowing into the radiator inflow passage 53*ri* to the amount of the cooling water flowing through the stack outflow passage 53*so* is increased.

Figure 9:
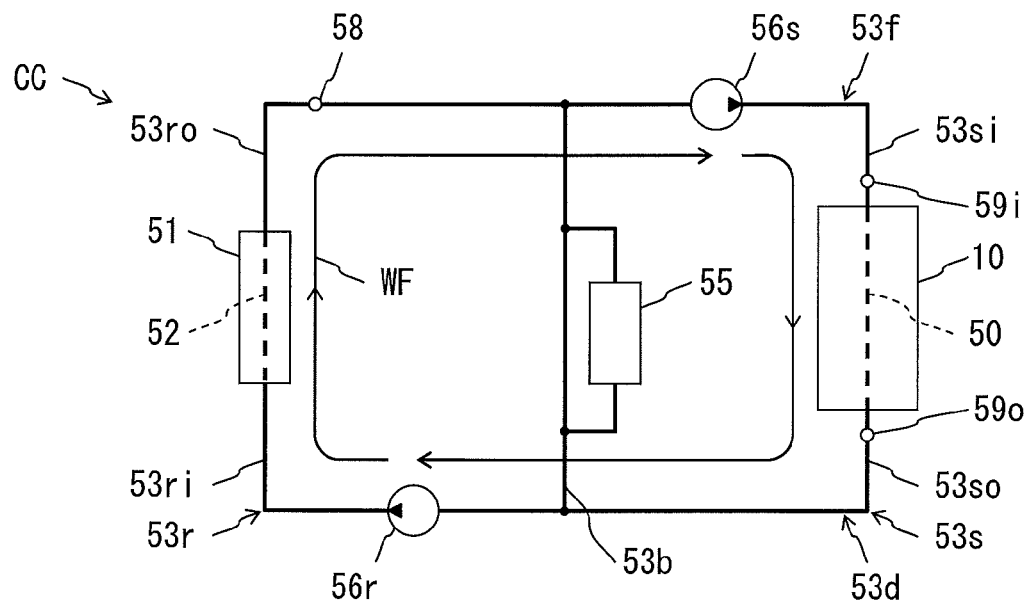
FIG. 9 is a schematic view of a cooling circuit explaining a bypass-less mode operation.

In a bypass-less mode operation shown in FIG. 9, the drive speed NPS of the stack side cooling water pump 56*s* is set to the bypass-less speed NPSX of the stack side cooling water pump 56*s* while the drive speed NPR of the radiator side cooling water pump 56*r* is set to the bypass-less speed NPRX of the radiator side cooling water pump 56*r*. That is, in the embodiment shown in FIG. 1 and FIG. 2, the drive speed NPS of the stack side cooling water pump 56*s* and the drive speed NPR of the radiator side cooling water pump 56*r* are set to positive values which are substantially equal to each other. In other words, the stack side cooling water pump 56*s* and the radiator side cooling water pump 56*r* are driven so that the discharge amount of the stack side cooling water pump 56*s* and the discharge amount of the radiator side cooling water pump 56*r* are substantially equal to each other. As a result, as shown in FIG. 9 by the arrow WF, the cooling water circulates through the radiator side cooling water passage 53*r* and the stack side cooling water passage 53*s* while it hardly flows through the bypass cooling water passage 53*b*. That is, the cooling water flows through the stack side cooling water passage 53*s* in the forward direction, flows through the radiator side cooling water passage 53*r* in the forward direction, but hardly flows through the bypass cooling water passage 53*b*. In this case, the amount of the cooling water flowing through the radiator side cooling water passage 53*r* and the amount of the cooling water flowing through the stack side cooling water passage 53*s* are substantially equal to each other. Note that, in the bypass-less mode operation, the amount of the cooling water flowing through the bypass cooling water passage 53*b* is preferably zero.

Figure 10:
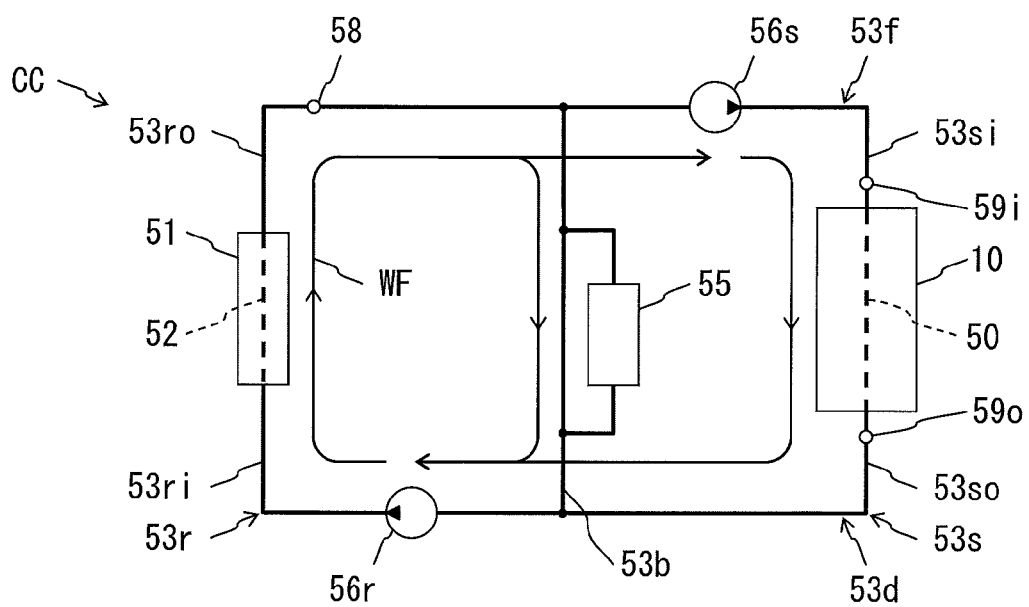
FIG. 10 is a schematic view of a cooling circuit explaining a stack partial bypass mode operation.

In a stack partial bypass mode operation shown in FIG. 10, the drive speed NPR of the radiator side cooling water pump 56*r* is set to a positive value. Further, the drive speed NPS of the stack side cooling water pump 56*s* is set to a positive value, zero, or a negative value which is greater than the stack bypass speed NPSB. More specifically, the drive speed NPS of the stack side cooling water pump 56*s* is set to a positive value, zero, or a negative value which is smaller than the bypass-less speed NPSX of the stack side cooling water pump 56*s* and greater than the stack bypass speed NPSB. In other words, the stack side cooling water pump 56*s* and the radiator side cooling water pump 56*r* are driven so that the discharge amount of the radiator side cooling water pump 56*r* is greater than the discharge amount of the stack side cooling water pump 56*s*. As a result, as shown in FIG. 10 by the arrow WF, the cooling water flows through the radiator side cooling water passage 53*r* and the bypass cooling water passage 53*b* while it flows through the stack side cooling water passage 53*s*. That is, the cooling water flows through the stack side cooling water passage 53*s* in the forward direction, flows through the radiator side cooling water passage 53*r* in the forward direction, and flows through the bypass cooling water passage 53*b* from the cooling water feed passage 53*f* toward the cooling water discharge passage 53*d*. In this case, a part of the cooling water having flowed through the radiator outflow passage 53*ro* flows into the bypass cooling water passage 53*b* while the remainder flows into the stack inflow passage 53*si*. Further, the amount of the cooling water flowing through the radiator side cooling water passage 53*r* is a total of the amount of the cooling water flowing through the stack side cooling water passage 53*s* and the amount of the cooling water flowing through the bypass cooling water passage 53*b*, therefore the amount of the cooling water flowing through the stack side cooling water passage 53*s* is smaller than the amount of the cooling water flowing through the radiator side cooling water passage 53*r*. Furthermore, if the drive speed NPS of the stack side cooling water pump 56*s* is lowered toward the stack bypass speed NPSB, a ratio of the amount of the cooling water flowing into the bypass cooling water passage 53*b* to the amount of the cooling water flowing through the radiator outflow passage 53*ro* is increased while a ratio of the amount of the cooling water flowing into the stack inflow passage 53*si* to the amount of the cooling water flowing through the radiator outflow passage 53*ro* is decreased. As opposed to this, if the drive speed NPS of the stack side cooling water pump 56*s* is raised toward the bypass-less speed NPSX of the stack side cooling water pump 56*s*, the ratio of the amount of the cooling water flowing into the bypass cooling water passage 53*b* to the amount of the cooling water flowing through the radiator outflow passage 53*ro* is decreased, while the ratio of the amount of the cooling water flowing into the stack inflow passage 53*si* to the amount of the cooling water flowing through the radiator outflow passage 53*ro* is increased.

Note that, in the radiator partial bypass mode operation shown in FIG. 8, if the drive speed NPS of the stack side cooling water pump 56*s* and the drive speed NPR of the radiator side cooling water pump 56*r* are controlled so that the amount of the cooling water flowing through the bypass cooling water passage 53*b* is decreased to substantially zero, the cooling water cooling mode operation is switched to the bypass-less mode operation shown in FIG. 9. As opposed to this, the drive speed NPS of the stack side cooling water pump 56*s* and the drive speed NPR of the radiator side cooling water pump 56*r* are controlled so that the amount of the cooling water flowing through the radiator side cooling water passage 53*r* is decreased to substantially zero, the cooling water cooling mode operation is switched to the radiator full bypass mode operation shown in FIG. 7.

On the other hand, in the stack partial bypass mode operation shown in FIG. 10, the drive speed NPS of the stack side cooling water pump 56*s* and the drive speed NPR of the radiator side cooling water pump 56*r* are controlled so that the amount of the cooling water flowing through the bypass cooling water passage 53b is decreased to substantially zero, the cooling water cooling mode operation is switched to the bypass-less mode operation shown in FIG. 9. Further, the drive speed NPS of the stack side cooling water pump 56s and the drive speed NPR of the radiator side cooling water pump 56r are controlled so that the amount of the cooling water flowing through the stack side cooling water passage 53s is decreased to substantially zero, the cooling water cooling mode operation is switched to the stack full bypass mode operation.

Note that, if a cooling water cooling mode operation where the cooling water flows through at least the stack side cooling water passage 53s is referred to as a "stack flow mode operation", in the embodiment shown in FIG. 1 and FIG. 2, the stack flow mode operation includes the radiator full bypass mode operation (FIG. 7), radiator partial bypass mode operation (FIG. 8), bypass-less mode operation (FIG. 9), and stack partial bypass mode operation (FIG. 10), as mentioned above. In another embodiment (not shown), the stack flow mode operation includes any one, any two, or any three of the radiator full bypass mode operation, radiator partial bypass mode operation, bypass-less mode operation, and stack partial bypass mode operation. Therefore, summarizing the embodiment shown in FIG. 1 and FIG. 2 and this other embodiment (not shown) together, the stack flow mode operation may include at least one of the radiator full bypass mode operation, radiator partial bypass mode operation, bypass-less mode operation, and stack partial bypass mode operation.

In this way, in the embodiment shown in FIG. 1 and FIG. 2, a flow of the cooling water can be switched by just controlling the drive speed NPS of the stack side cooling water pump 56s and the drive speed NPR of the radiator side cooling water pump 56r. That is, no solenoid valve or check valve is required for controlling the flow of the cooling water. Therefore, the flow of cooling water can be reliably controlled with a less expensive and simpler design.

Now then, in the embodiment shown in FIG. 1 and FIG. 2, start control is performed at the time of start of power generation in the fuel cell stack 10. That is, first, an electrical conductivity of the cooling water is detected by the electrical conductivity sensor 58. If the electrical conductivity EC of the cooling water is higher than a predetermined first set electrical conductivity EC1, first the stack full bypass mode operation is performed, next the cooling water cooling mode operation is switched to the stack flow mode operation. As opposed to this, if the electrical conductivity EC of the cooling water is lower than the first set electrical conductivity EC1, the stack flow mode operation is performed without performing the stack full bypass mode operation. This start control will be further explained with reference to FIG. 11 and FIG. 12.

Figure 11:
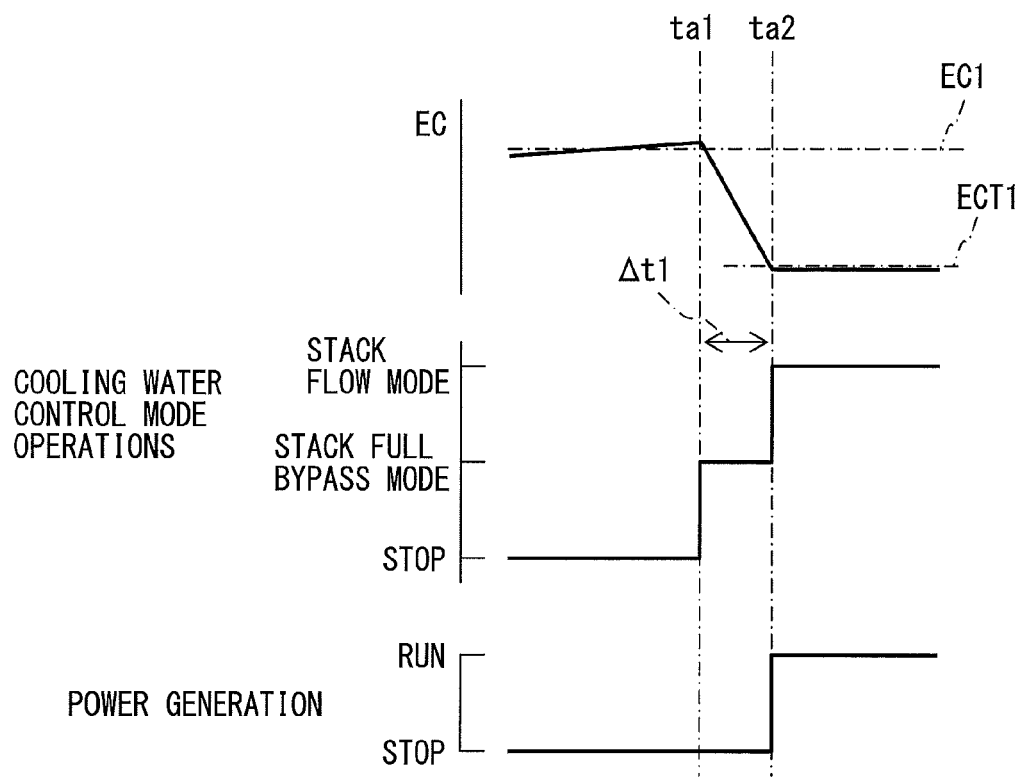
FIG. 11 is a time chart explaining start control.

In FIG. 11, the time ta1 shows the time at which a signal to start the power generation in the fuel cell stack 10 is issued. In the example shown in FIG. 11, the electrical conductivity EC of the cooling water at the time ta1 is higher than the first set electrical conductivity EC1, therefore first the stack full bypass mode operation is performed. As a result, cooling water with a high electrical conductivity is suppressed from flowing into the fuel cell stack 10. Further, the cooling water is guided to the deionizer 55, therefore the electrical conductivity EC of the cooling water gradually falls. In the example shown in FIG. 11, the stack full bypass mode operation is performed over a predetermined first set time Δt1. That is, at the time ta2 when the first set time Δt1 has elapsed from when the stack full bypass mode operation is started, the stack full bypass mode operation is ended and a stack flow mode operation is started. As a result, cooling water is introduced into the fuel cell stack 10 and cooling of the fuel cell stack 10 is started. At this time, the electrical conductivity EC of the cooling water has been lowered, therefore the electrical insulation ability of the fuel cell stack 10 is suppressed from falling. Note that in this stack full bypass mode operation, the drive speed or the discharge amount of the radiator side cooling water pump 56r is set to the maximum speed or the maximum amount of the radiator side cooling water pump 56r. This can lower the electrical conductivity EC of the cooling water quickly.

When the stack full bypass mode operation is performed, almost no cooling water flows through the fuel cell stack 10. If power generation is performed in the fuel cell stack 10 under such a condition, the temperature in the fuel cell stack 10 may excessively rise or may become unpreferably uneven. Therefore, in the example shown in FIG. 11, when the stack full bypass mode operation is performed, power generation in the fuel cell stack 10 is not performed. If the stack full bypass mode operation ends, that is, if a stack flow mode operation is started, the power generation in the fuel cell stack 10 is started. In other words, even if a signal to start the power generation in the fuel cell stack 10 is issued, the power generation in the fuel cell stack 10 is delayed. In the example shown in FIG. 11, the power generation in the fuel cell stack 10 is delayed by the first set time Δt1. As a result, the temperature of the fuel cell stack 10 is maintained low and even.

Note that at the time of start of power generation in the fuel cell stack 10 where the stack full bypass mode operation is performed, the temperature of the fuel cell stack 10 is not necessarily high. Therefore, in another embodiment (not shown), even when the stack full bypass mode operation is performed, power generation in the fuel cell stack 10 is performed. That is, in this other embodiment, when a signal to start power generation in the fuel cell stack 10 is issued, the stack full bypass mode operation is started and power generation in the fuel cell stack 10 is started without delay.

As explained above, in the stack full bypass mode operation, the cooling water is almost completely kept from flowing through the fuel cell stack 10. That is, regardless of the fact that the cooling water is for cooling the fuel cell stack 10, it hardly flows through the fuel cell stack 10 in the stack full bypass mode operation, but flows at the outside of the fuel cell stack 10. This enables sending as large an amount of cooling water to the deionizer 55 as possible, whereby the electrical conductivity EC of the cooling water can be made to quickly fall as fast as possible and simultaneously cooling water with a high electrical conductivity can be reliably suppressed from flowing into the fuel cell stack 10. Such an idea has not existed up to now.

Figure 12:
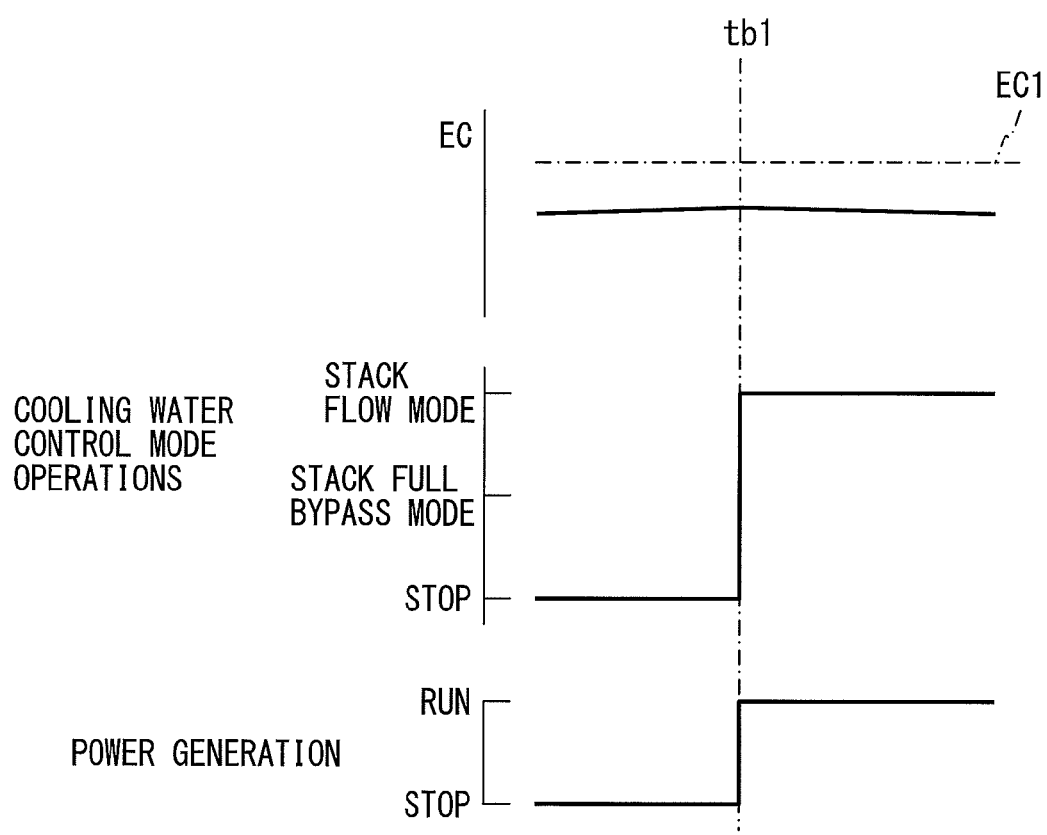
FIG. 12 is a time chart explaining start control.

On the other hand, in FIG. 12, the time tb1 shows the time at which a signal to start power generation in the fuel cell stack 10 is issued. In the example shown in FIG. 12, at the time tb1, the electrical conductivity EC of the cooling water is lower than the first set electrical conductivity EC1. Therefore, the stack flow mode operation is started without the stack full bypass mode operation being performed. As a result, the cooling of the fuel cell stack 10 is quickly started.

In the example shown in FIG. 12, the stack full bypass mode operation is not performed and thus the power generation in the fuel cell stack 10 is started at the time tb1. In other words, when a signal to start power generation in the fuel cell stack 10 is issued, power generation in the fuel cell stack 10 is started without delay.

Furthermore, in the embodiment shown in FIG. 1 and FIG. 2, at the time of start of power generation in the fuel cell stack 10, if the electrical conductivity EC of the cooling water is higher than a predetermined first threshold electrical conductivity ECT1 even if performing the stack full bypass mode operation over the first set time Δt1, the alarm 69 is actuated to inform the vehicle operator of a fact that lowering of the electrical conductivity EC of the cooling water is difficult. As opposed to this, as shown in FIG. 11, if the electrical conductivity EC of the cooling water became lower than the first threshold electrical conductivity ECT1 as a result of performance of the stack full bypass mode operation over the first set time Δt1 at the time of start of power generation in the fuel cell stack 10, the alarm 69 is maintained in the stopped state. In the example shown in FIG. 11, the first threshold electrical conductivity ECT1 is lower than the first set electrical conductivity EC1.

Note that, as explained above, in the example shown in FIG. 11, the stack full bypass mode operation is performed over the first set time Δt1. In another embodiment (not shown), the stack full bypass mode operation is performed until the electrical conductivity EC of the cooling water falls to a small constant value, next the cooling water cooling mode operation is switched to a stack flow mode operation. This small constant value is lower than the first set electrical conductivity EC1 and, for example, is substantially equal to the first threshold electrical conductivity ECT1.

In still another embodiment (not shown), at the time of start of power generation in the fuel cell stack 10, the stack full bypass mode operation or a stack flow mode operation is performed regardless of the electrical conductivity EC of the cooling water.

Now then, in the embodiment shown in FIG. 1 and FIG. 2, as explained above, if power generation in the fuel cell stack 10 is started, a stack flow mode operation is performed after the stack full bypass mode operation is performed or without the stack full bypass mode operation being performed. As explained above, in the embodiment shown in FIG. 1 and FIG. 2, the stack flow mode operation includes the radiator full bypass mode operation (FIG. 7), the radiator partial bypass mode operation (FIG. 8), the bypass-less mode operation (FIG. 9), and the stack partial bypass mode operation (FIG. 10).

Specifically, when the stack temperature TS is lower than a predetermined, lower set temperature TSL, the radiator full bypass mode operation is performed.

As opposed to this, when the stack temperature TS is higher than the lower set temperature TSL, the stack partial bypass mode operation, the radiator partial bypass mode operation, or the bypass-less mode operation is performed. That is, when the stack temperature TS is higher than the lower set temperature TSL, if the electrical conductivity EC of the cooling water is higher than a predetermined second set electrical conductivity EC2, the stack partial bypass mode operation is performed. As opposed to this, when the stack temperature TS is higher than the lower set temperature TSL, if the electrical conductivity EC of the cooling water is lower than the second set electrical conductivity EC2 and the stack temperature TS is lower than a predetermined, higher set temperature TSH, the radiator partial bypass mode operation is performed. On the other hand, when the stack temperature TS is higher than the lower set temperature TSL, if the electrical conductivity EC of the cooling water is lower than the second set electrical conductivity EC2 and the stack temperature TS is higher than the higher set temperature TSH, the bypass-less mode operation is performed. The second set electrical conductivity EC2 is for example substantially equal to the first set electrical conductivity EC1.

Figure 13:
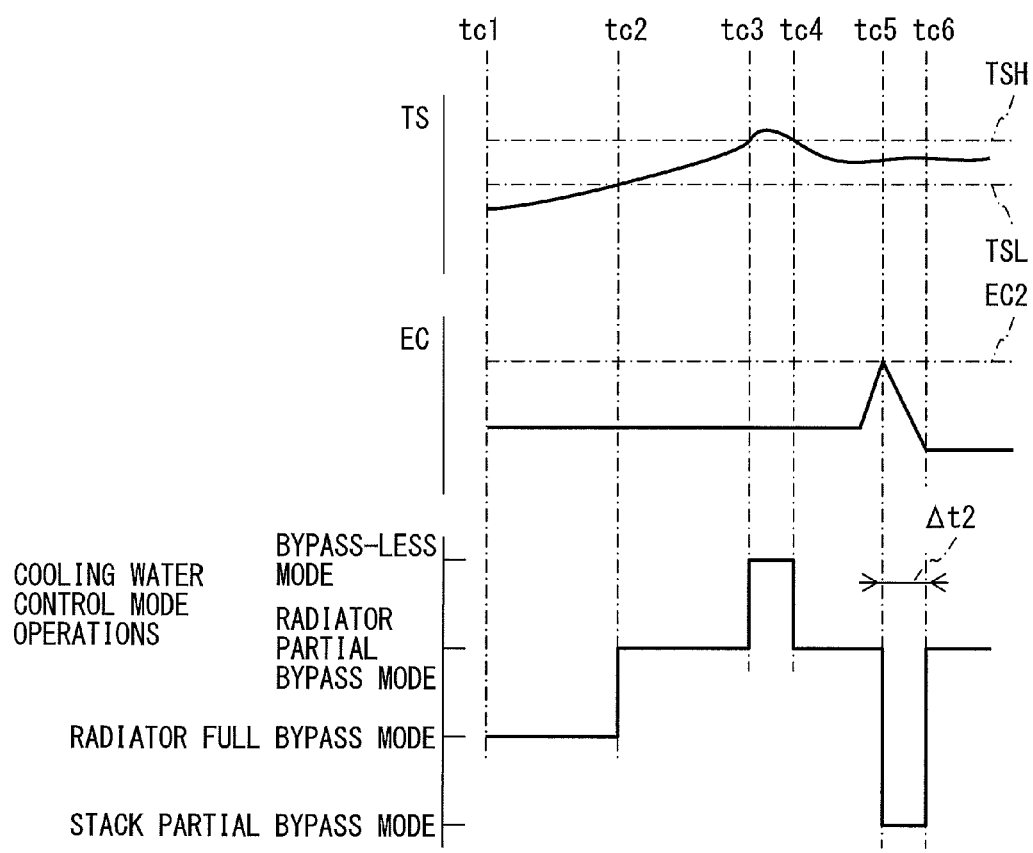
FIG. 13 is a time chart explaining cooling water control after a signal to start power generation in a fuel cell stack 10 is issued.

That is, in FIG. 13, the time tc1 shows the time at which the stack flow mode operation should be started. In the example shown in FIG. 13, the stack temperature TS at the time tc1 is lower than the lower set temperature TSL, therefore the radiator full bypass mode operation is performed. In the radiator full bypass mode operation, the cooling water does not flow through the radiator 51, so a drop in the temperature of the cooling water is suppressed and therefore the stack temperature TS quickly rises. That is, warmup of the fuel cell stack 10 is promoted. In this case, the drive speed or the discharge amount of the stack side cooling water pump 56s is set so that for example a difference between the temperature of the cooling water in the stack outflow passage 53so and the temperature of the cooling water in the stack inflow passage 53si, that is, a stack temperature difference, is maintained in a target range.

Next, at the time tc2, the stack temperature TS becomes higher than the lower set temperature TSL. In the example shown in FIG. 13, at the time tc2, the electrical conductivity EC of the cooling water is lower than the second set electrical conductivity EC2, while the stack temperature TS is lower than the higher set temperature TSH. Therefore, the radiator partial bypass mode operation is performed. As a result, part of the cooling water bypasses the radiator 51, therefore a drop in the temperature of the cooling water is suppressed. Further, part of the cooling water flows through the deionizer 55, therefore the electrical conductivity EC of the cooling water is suppressed. Note that, at the time of the radiator partial bypass mode operation, the drive speeds or the discharge amounts of the stack side cooling water pump 56s and the radiator side cooling water pump 56r are set so that the stack temperature TS and the stack temperature difference are maintained in the respective target ranges.

Next, at the time tc3, if the stack temperature TS becomes higher than the higher set temperature TSH, the cooling water cooling mode operation is switched to the bypass-less mode operation. As a result, a drop in the temperature of the cooling water at the radiator 51 is promoted and the stack temperature TS starts to fall. Note that, at the time of the bypass-less mode operation, the drive speeds or the discharge amounts of the stack side cooling water pump 56s and radiator side cooling water pump 56r are set so that the stack temperature TS and the stack temperature difference are maintained in the respective target ranges.

Next, at the time tc4, if the stack temperature TS becomes lower than the higher set temperature TSH, the cooling water cooling mode operation is returned to the radiator partial bypass mode operation.

Next, at the time tc5, if the electrical conductivity EC of the cooling water becomes higher than the second set electrical conductivity EC2 for some sort of reason, the cooling water cooling mode operation is switched to the stack partial bypass mode operation. As a result, the cooling water with a high electrical conductivity EC is suppressed from flowing into the fuel cell stack 10. Further, part of the cooling water flows through the deionizer 55, therefore the electrical conductivity EC of the cooling water is suppressed. In the stack partial bypass mode operation, as explained above, the amount of the cooling water which is sent to the fuel cell stack 10 is smaller than the amount of the cooling water which is sent to the radiator 51, so it may be considered that the cooling of the fuel cell stack 10 is insufficient. However, a large amount of the cooling water is sent to the radiator 51, so the temperature of the cooling water is sufficiently lowered and the cooling water with low temperature is sent to the fuel cell stack 10, thus the fuel cell stack 10 can be sufficiently cooled. Therefore, when the stack partial bypass mode operation is performed, power generation in the fuel cell stack 10 is possible. Note that at the time of the stack partial bypass mode operation, the drive speeds or the discharge amounts of the stack side cooling water pump 56s and radiator side cooling water pump 56r are set so that the stack temperature TS and the stack temperature difference are maintained in the respective target ranges.

In the example shown in FIG. 13, the stack partial bypass mode operation is performed over a predetermined second set time Δt2. That is, at the time tc6 after the second set time Δt2 has elapsed from when the stack partial bypass mode operation was started, since the stack temperature TS at this time is lower than the higher set temperature TSH, the cooling water cooling mode operation is switched from the stack partial bypass mode operation to the radiator partial bypass mode operation. In another embodiment (not shown), the stack partial bypass mode operation is performed until the electrical conductivity EC of the cooling water falls to a small constant value. This small constant value is lower than the second set electrical conductivity EC2 and, for example, is substantially equal to the first threshold electrical conductivity ECT1.

Note that, while not shown in FIG. 13, in the embodiment shown in FIG. 1 and FIG. 2, if the electrical conductivity EC of the cooling water becomes higher than the second set electrical conductivity EC2 when the bypass-less mode operation is performed, the cooling water cooling mode operation is switched to the stack partial bypass mode operation. That is, if the electrical conductivity EC of the cooling water is higher than the second set electrical conductivity EC2, the stack partial bypass mode operation is performed even if the stack temperature TS is higher than the higher set temperature TSH. In another embodiment (not shown), if the stack temperature TS is higher than the higher set temperature TSH, the bypass-less mode operation is performed even if the electrical conductivity EC of the cooling water is higher than the second set electrical conductivity EC2.

Further, in the embodiment shown in FIG. 1 and FIG. 2, if the stack partial bypass mode operation is performed when the stack flow mode operation should be performed, the alarm 69 is actuated. As opposed to this, if the radiator full bypass mode operation or the radiator partial bypass mode operation or the bypass-less mode operation is performed when the stack flow mode operation should be performed, the alarm 69 is maintained in the stopped state.

As explained above, if the stack flow mode operation is started, power generation in the fuel cell stack 10 is started. Therefore, in the embodiment shown in FIG. 1 and FIG. 2, during power generation in the fuel cell stack 10, the electrical conductivity EC of the cooling water is suppressed while the fuel cell stack 10 is cooled.

When the power generation in the fuel cell stack 10 is stopped, the stack side cooling water pump 56s and the radiator side cooling water pump 56r are stopped.

In the embodiment shown in FIG. 1 and FIG. 2, further, even while power generation in the fuel cell stack 10 is stopped, the electrical conductivity EC of the cooling water is suppressed. That is, while the power generation in the fuel cell stack 10 is stopped, each time a predetermined third set time Δt3 elapses, the electrical conductivity EC of the cooling water is detected. If the electrical conductivity EC of the cooling water is higher than a predetermined set value ECS, the stack full bypass mode operation is temporarily performed. Due to this, the electrical conductivity EC of the cooling water falls. The set value ECS is for example substantially equal to the first set electrical conductivity EC1.

Figure 14:
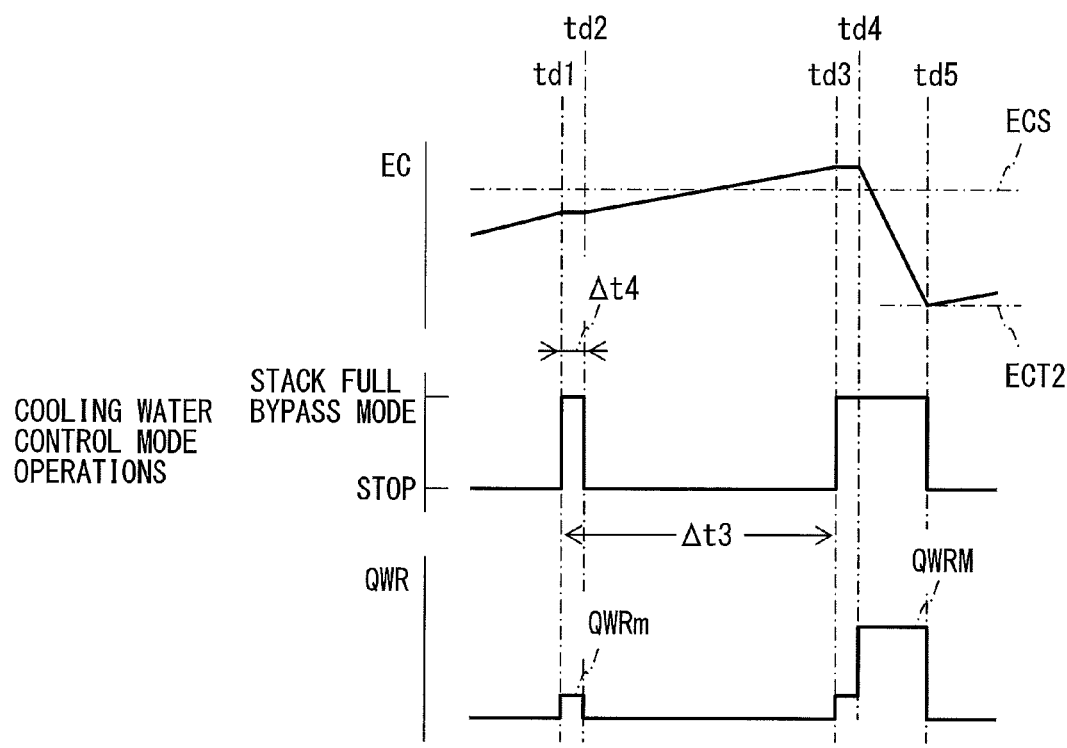
FIG. 14 is a time chart explaining cooling water control while power generation in a fuel cell stack is stopped.

That is, in the example shown in FIG. 14, at the time td1, the stack full bypass mode operation is performed. In this case, the discharge amount QWR of the radiator side cooling water pump 56r is set to a small constant amount QWRm (>0). As a result, the electrical conductivity EC of the cooling water is averaged. In the example shown in FIG. 14, the stack full bypass mode operation is performed over a predetermined fourth set time Δt4. Next, at the time td2 after the fourth set time Δt4 elapses from when the stack full bypass mode operation is started, the electrical conductivity EC of the cooling water is detected. The electrical conductivity EC of the cooling water at the time td2 is lower than the set value ECS. Therefore, the stack full bypass mode operation is stopped.

Next, at the time td3 after the third set time Δt3 elapses from the previous stack full bypass mode operation, the discharge amount QWR of the radiator side cooling water pump 56r is again set to the constant amount QWRm while the stack full bypass mode operation is performed. Next, at the time td4 after the fourth set time Δt4 elapses, the electrical conductivity EC of the cooling water is detected. The electrical conductivity EC of the cooling water at the time td4 is higher than the set value ECS. Therefore, the stack full bypass mode operation is continued. In this case, the discharge amount QWR of the radiator side cooling water pump 56r is increased to the maximum amount QWRM (>0) of the radiator side cooling water pump 56r. As a result, the electrical conductivity EC of the cooling water quickly falls. Next, if, at the time td5, the electrical conductivity EC of the cooling water falls to a predetermined second threshold electrical conductivity ECT2, the stack full bypass mode operation is stopped. The second threshold electrical conductivity ECT2 is lower than the set value ECS and, for example, is substantially equal to the first threshold electrical conductivity ECT1. In another embodiment (not shown), the stack full bypass mode operation is performed over a predetermined time.

In this way, in the embodiment shown in FIG. 1 and FIG. 2, the electrical conductivity EC of the cooling water is suppressed while power generation in the fuel cell stack 10 is stopped. As a result, the time during which the stack full bypass mode operation is performed at the time of start of power generation in the fuel cell stack 10, that is, the first set time Δt1, can be shortened. That is, the time Δt1 (FIG. 8) of the stack full bypass mode operation required when power generation in the fuel cell stack 10 should be started can be shortened or the stack full bypass mode operation can be omitted, therefore it is possible to quickly start the power generation in the fuel cell stack 10.

Note that, in the example shown in FIG. 14, the electrical conductivity EC of the cooling water is detected after the stack full bypass mode operation is performed. In another embodiment (not shown), the electrical conductivity EC of the cooling water is detected without performing the stack full bypass mode operation.

In this way, in the embodiment which is shown in FIG. 1 and FIG. 2, the radiator side cooling water pump 56r and the stack side cooling water pump 56s are controlled to thereby perform one of the stack flow mode operation and the stack full bypass mode operation selectively. In this case, the stack flow mode operation includes the radiator full bypass mode operation, radiator partial bypass mode operation, bypass-less mode operation, and stack partial bypass mode operation.

Figure 15:
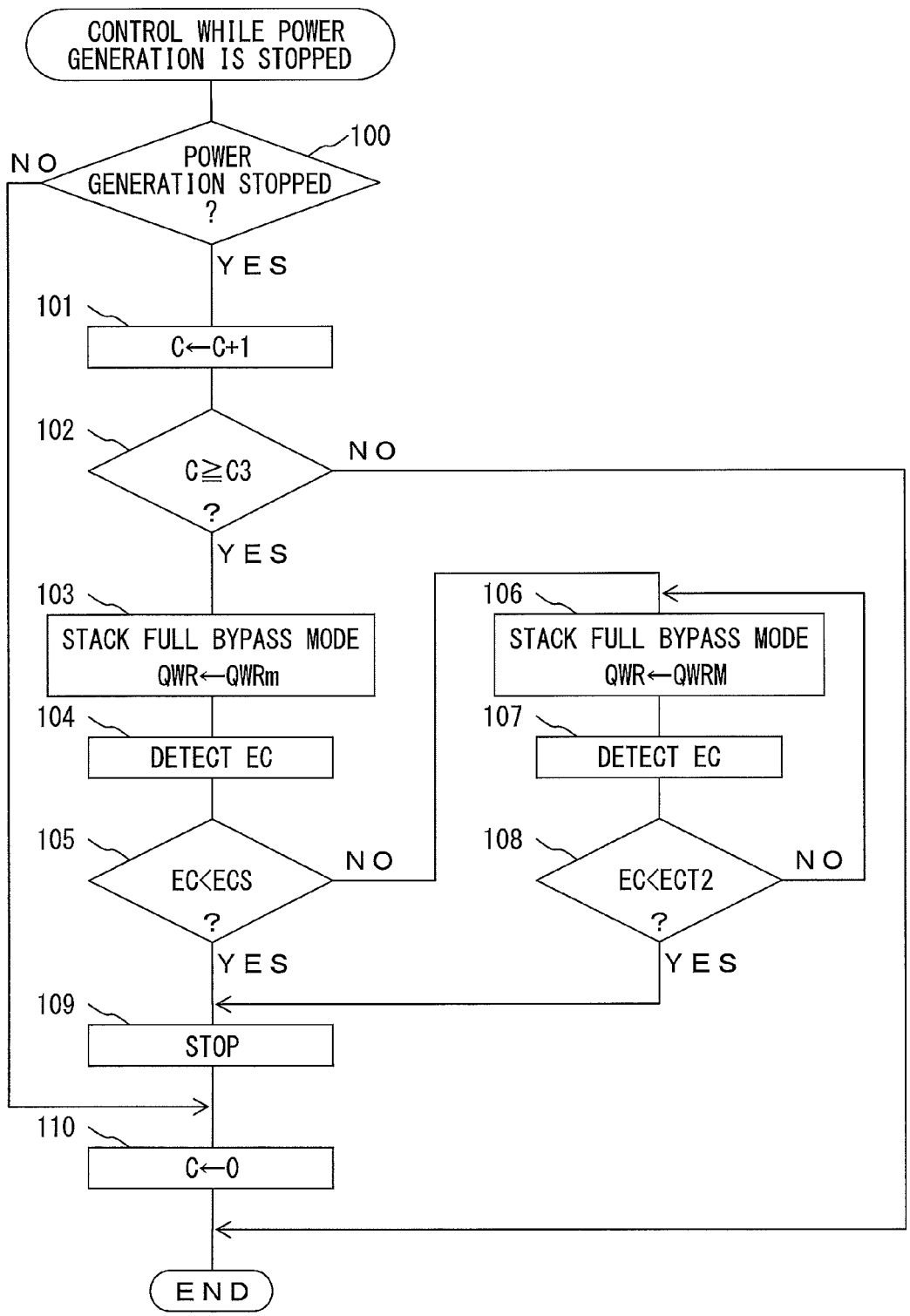
FIG. 15 is a flow chart for executing cooling water control while power generation in a fuel cell stack is stopped.

FIG. 15 shows a routine for executing cooling water control while the power generation in the fuel cell stack 10 has stopped. This routine is performed by interruption every predetermined set time.

Referring to FIG. 15, at step 100, it is judged if the power generation in the fuel cell stack 10 has stopped. If the power generation in the fuel cell stack 10 has stopped, next the routine proceeds to step 101 where a counter value C is incremented by 1. This counter value C shows the elapsed time from when the power generation in the fuel cell stack 10 was stopped or from when the previous stack full bypass mode operation was started. At the following step 102, it is judged if the counter value C is equal to or larger than a set value C3 corresponding to the above-mentioned third set time $\Delta t3$. If C<C3, the processing step is ended. If C≥C3, next the routine proceeds to step 103 where the discharge amount QWR of the radiator side cooling water pump 56r is set to the constant amount QWRm while the stack full bypass mode operation is performed over the fourth set time $\Delta t4$. At the following step 104, the electrical conductivity EC of the cooling water is detected. At the following step 105, it is judged if the electrical conductivity EC of the cooling water is lower than the set value ECS. If EC≥ECS, next the routine proceeds to step 106 where the discharge amount QWR of the radiator side cooling water pump 56r is set to the maximum amount QWRM while the stack full bypass mode operation is performed. At the following step 107, the electrical conductivity EC of the cooling water is detected. At the following step 108, it is judged if the electrical conductivity EC of the cooling water is lower than the second threshold electrical conductivity ECT2. If EC≥ECT2, the routine returns to step 106. When EC<ECT2, the routine proceeds to step 109. On the other hand, if EC<ECS at step 105, the routine also proceeds to step 109.

At step 109, the stack full bypass mode operation is stopped. At the following step 110, the counter value C is returned to zero. On the other hand, if the fuel cell stack 10 is generating power at step 100, next the routine also proceeds to step 110.

Figure 16:
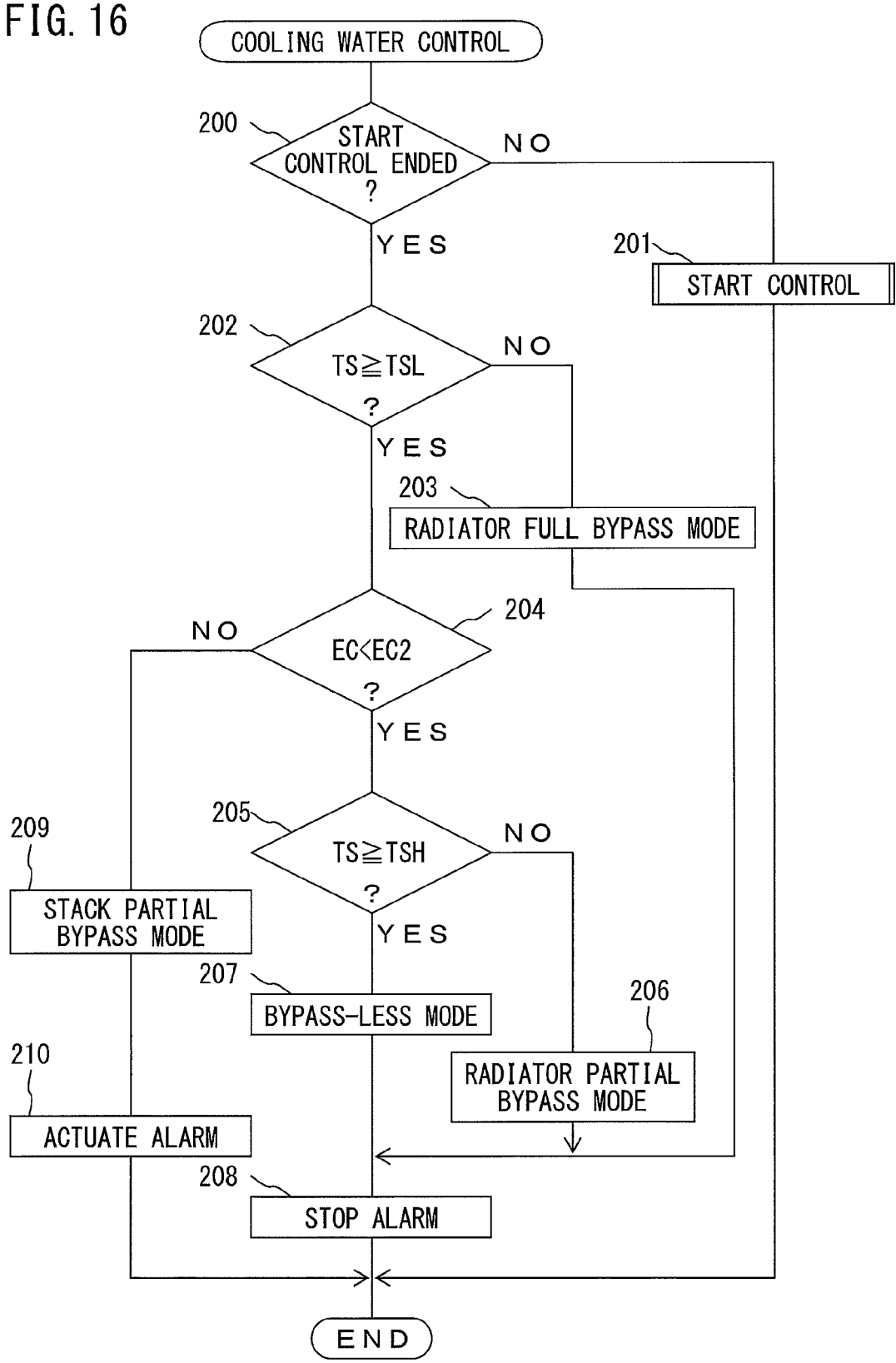
FIG. 16 is a flow chart for executing cooling water control after a signal to start power generation in a fuel cell stack 10 is issued.

FIG. 16 shows a routine for performing cooling water control after a signal to start power generation in the fuel cell stack 10 is issued. This routine is executed by interruption every predetermined set time.

Referring to FIG. 16, at step 200, it is judged if the above-mentioned start control has been completed at the time of start of power generation in the fuel cell stack 10. If the start control has not been completed, next the routine proceeds to step 201 where a start control routine for executing start control is performed. This start control routine is shown in FIG. 17.

Figure 17:
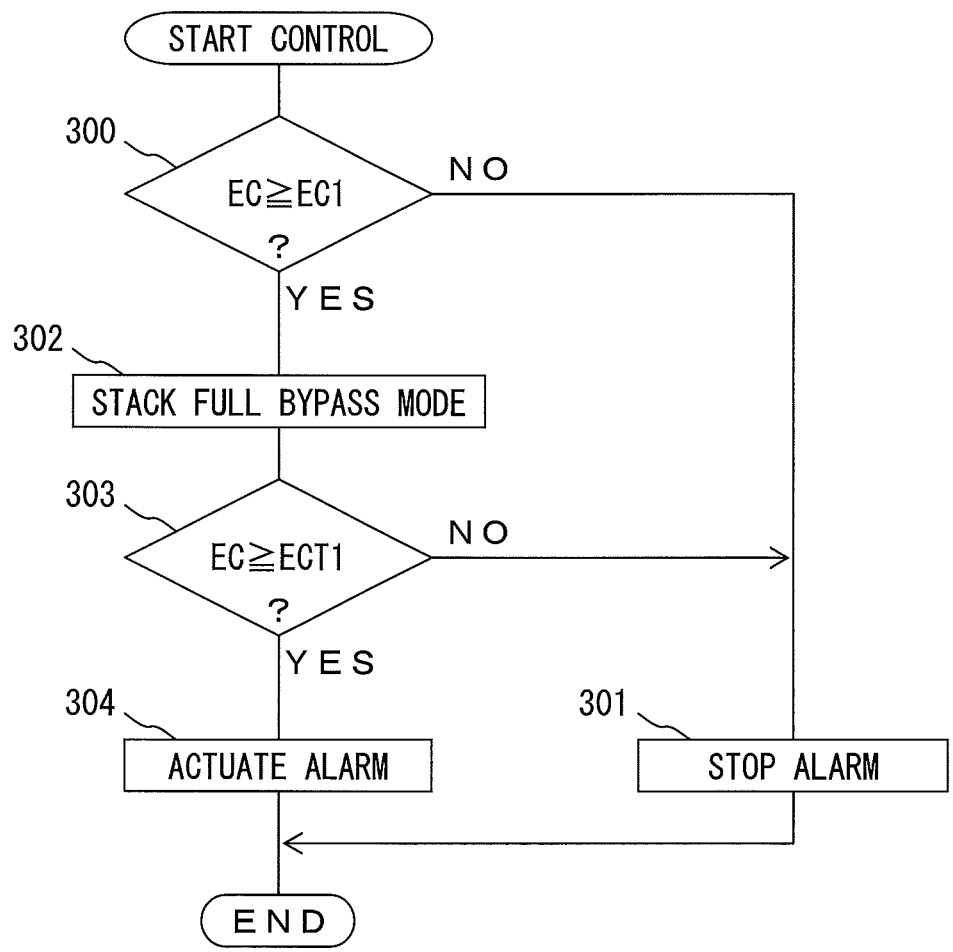
FIG. 17 is a flow chart for executing start control.

Referring to FIG. 17, at step 300, it is judged if the electrical conductivity EC of the cooling water is equal to or higher than the first set electrical conductivity EC1. If EC<EC1, next the routine proceeds to step 301 where the alarm 69 is stopped. As opposed to this, if EC≥EC1, the routine proceeds from step 300 to step 302 where the stack full bypass mode operation is performed over the first set time $\Delta t1$. At the following step 303, it is judged if the electrical conductivity EC of the cooling water is equal to or higher than the first threshold electrical conductivity EC1. If EC<ECT1, next the routine proceeds to step 301. As opposed to this, if EC≥ECT1, next the routine proceeds to step 304 where the alarm 69 is actuated.

Referring again to FIG. 16, when the start control routine ends, the routine proceeds from step 200 to step 202 where it is judged if the stack temperature TS is equal to or higher than the lower set temperature TSL. If TS<TSL, next the routine proceeds to step 203 where the radiator full bypass mode operation is performed. Next, the routine proceeds to step 208. As opposed to this, if TS≥TSL, the routine proceeds from step 202 to step 204 where it is judged if the electrical conductivity EC of the cooling water is lower than the second set electrical conductivity EC2. If EC<EC2, next the routine proceeds to step 205 where it is judged if the stack temperature TS is equal to or higher than the higher set temperature TSH. If TS<TSH, next the routine proceeds to step 206 where the radiator partial bypass mode operation is performed. Next, the routine proceeds to step 208. As opposed to this, if TS≥TSH, the routine proceeds from step 205 to step 207 where the bypass-less mode operation is performed. Next, the routine proceeds to step 208. At step 208, the alarm 69 is stopped.

On the other hand, if EC≥EC2, the routine proceeds from step 204 to step 209 where the stack partial bypass mode operation is performed. At the following step 210, the alarm 69 is actuated.

Figure 18:
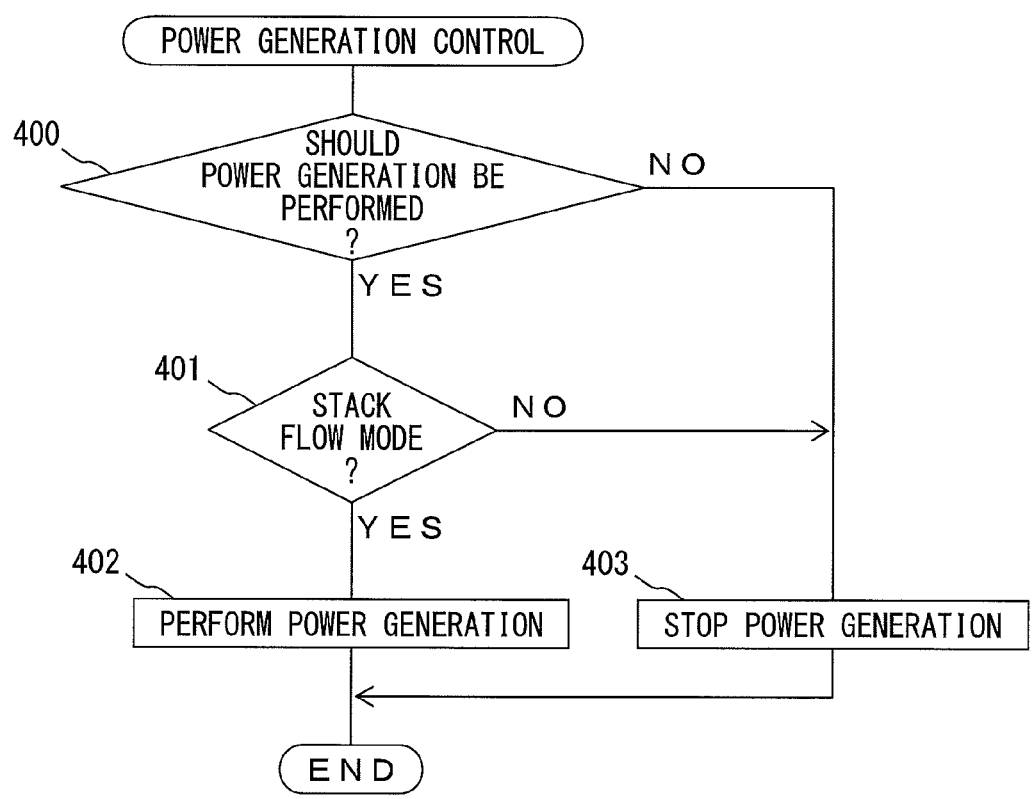
FIG. 18 is a flow chart for executing power generation control.

FIG. 18 shows a routine for executing the above-mentioned power generation control of the fuel cell stack 10. This routine is executed by interruption every predetermined set time.

Referring to FIG. 18, at step 400, it is judged if power generation should be performed in the fuel cell stack 10. If power generation should be performed in the fuel cell stack 10, that is, if the signal to start power generation in the fuel cell stack 10 is issued, the routine proceeds to step 401 where it is judged if the stack flow mode operation is being performed. If the stack flow mode operation is being performed, that is, if the cooling water flows through the fuel cell stack 10, next the routine proceeds to step 402 where power generation in the fuel cell stack 10 is performed. That is, the fuel cell stack 10 is fed hydrogen gas and air. As opposed to this, if power generation in the fuel cell stack 10 should not be performed, that is, if the signal to start power generation in the fuel cell stack 10 is not issued, the routine proceeds from step 400 to step 403. Further, if the stack flow mode operation is not being performed, that is, if the cooling water hardly flows through the fuel cell stack 10, the routine proceeds from step 401 to step 403. At step 403, power generation in the fuel cell stack 10 is stopped. That is, the feed of hydrogen gas and air to the fuel cell stack 10 is stopped.

Figure 19:
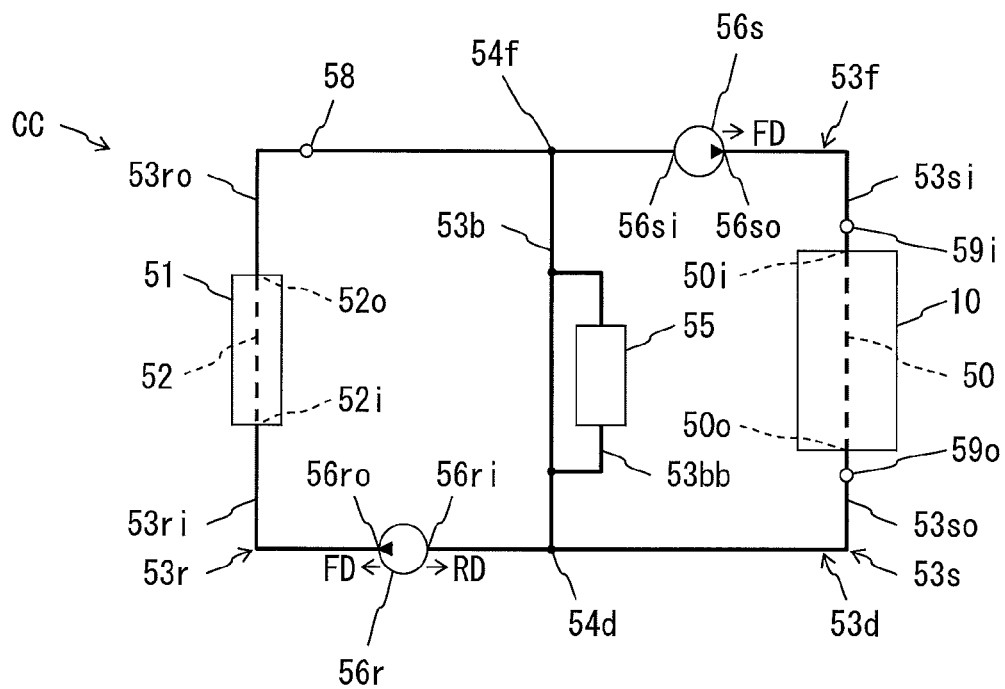
FIG. 19 is a view showing another embodiment according to the present invention.

FIG. 19 shows another embodiment according to the present invention. The embodiment shown in FIG. 19 differs in configuration from the embodiment shown in FIG. 1 and FIG. 2 on the point that the stack side cooling water pump 56s is formed from a pump able to change an amount of the cooling water discharged, but not able to change a direction of the cooling water discharged. That is, except for a case where the cooling water passes through the stack side cooling water pump 56s when the stack side cooling water pump 56s is stopped etc., the stack side cooling water pump 56s discharges the cooling water only in the forward direction FD. The stack side cooling water pump 56s is formed from a rotary pump, reciprocating pump, or non-volume type pump.

In the embodiment shown in FIG. 19, the stack side cooling water pump 56s and the radiator side cooling water pump 56r are respectively controlled to thereby control the amount of cooling water flowing through the stack side cooling water passage 53s, the amount of cooling water flowing through the radiator side cooling water passage 53r, and the direction and amount of the cooling water flowing through the bypass cooling water passage 53b, respectively.

Specifically, in the embodiment shown in FIG. 19, the radiator full bypass mode operation (FIG. 7) is performed. Alternatively, the radiator partial bypass mode operation (FIG. 8) is performed. Alternatively, the bypass-less mode operation (FIG. 9) is performed. Alternatively, the stack partial bypass mode operation (FIG. 10) is performed. In this case, driving the stack side cooling water pump 56s corresponds to setting the drive speed of the stack side cooling water pump 56s to a positive value in the embodiment of FIG. 1.

Figure 20:
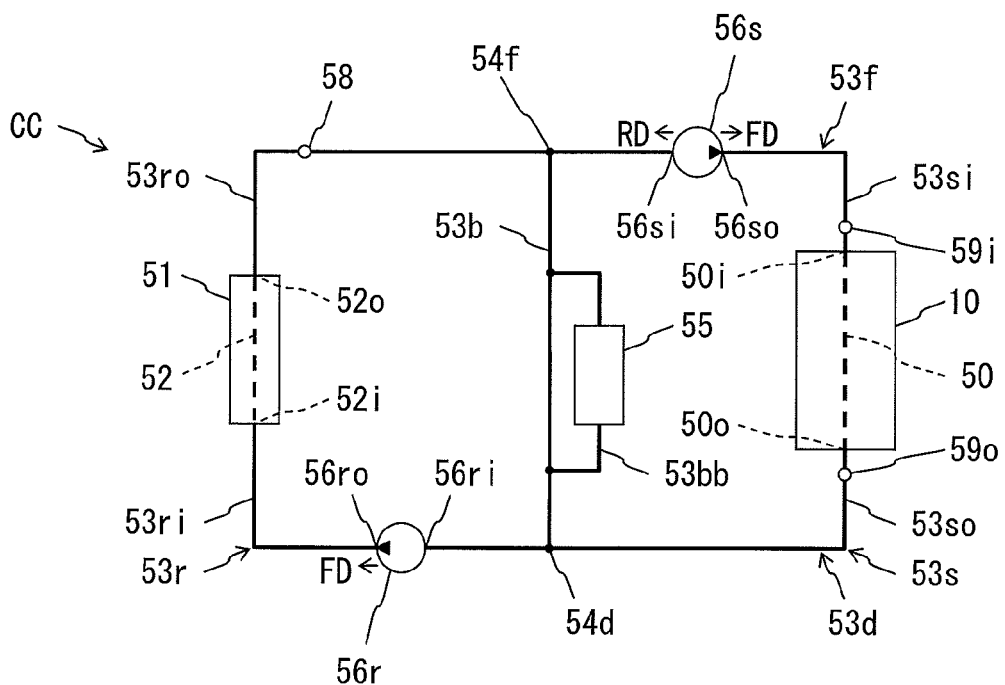
FIG. 20 is a view showing still another embodiment according to the present invention.

FIG. 20 shows still another embodiment according to the present invention. The embodiment shown in FIG. 20 differs in configuration from the embodiment shown in FIG. 1 and FIG. 2 on the point that the radiator side cooling water pump 56r is formed from a pump able to change an amount of the cooling water discharged, but not able to change a direction of the cooling water discharged. That is, except for a case where the cooling water passes through the radiator side cooling water pump 56r when the radiator side cooling water pump 56r is stopped etc., the radiator side cooling water pump 56r discharges the cooling water only in the forward direction FD. The radiator side cooling water pump 56r is formed from a rotary pump, reciprocating pump, or non-volume type pump.

In the embodiment shown in FIG. 20, the stack side cooling water pump 56s and the radiator side cooling water pump 56r are respectively controlled to thereby control the amount of cooling water flowing through the stack side cooling water passage 53s, the amount of cooling water flowing through the radiator side cooling water passage 53r, and the direction and amount of the cooling water flowing through the bypass cooling water passage 53b, respectively.

Specifically, in the embodiment shown in FIG. 20, the stack full bypass mode operation (FIG. 6) is performed. Alternatively, the stack partial bypass mode operation (FIG. 10) is performed. Alternatively, the bypass-less mode operation (FIG. 9) is performed. Alternatively, the radiator partial bypass mode operation (FIG. 8) is performed. In this case, driving the radiator side cooling water pump 56r corresponds to setting the drive speed of the radiator side cooling water pump 56r to a positive value in the embodiment of FIG. 1 and FIG. 2.

It is possible to reliably control a flow of a cooling water with a less expensive and more simpler design.

While the invention has been described by reference to specific embodiments chosen for purposes of illustration, it should be apparent that numerous modifications could be made thereto, by those skilled in the art, without departing from the basic concept and scope of the invention.

What is claimed is:

1. A fuel cell system comprising:
a fuel cell stack configured to generate electric power by an electrochemical reaction between fuel gas and an oxidizing gas;
a radiator configured to lower a temperature of a cooling water for the fuel cell stack;
a cooling water feed passage connecting an outlet of an in-radiator cooling water passage in the radiator and an inlet of an in-stack cooling water passage in the fuel cell stack with each other, and a cooling water discharge passage connecting an outlet of the in-stack cooling water passage and an inlet of the in-radiator cooling water passage with each other, the cooling water feed passage comprising a feed side branching point, a radiator outflow passage from the outlet of the in-radiator cooling water passage to the feed side branching point, and a stack inflow passage from the feed side branching point to the inlet of the in-stack cooling water passage, the cooling water discharge passage comprising a discharge side branching point, a stack outflow passage from the outlet of the in-stack cooling water passage to the discharge side branching point, and a radiator inflow passage from the discharge side branching point to the inlet of the in-radiator cooling water passage, the stack inflow passage, the in-stack cooling water passage, and the stack outflow passage configuring a stack side cooling water passage, and the radiator inflow passage, the in-radiator cooling water passage, and the radiator outflow passage configuring a radiator side cooling water passage;
a bypass cooling water passage connecting the feed side branching point and the discharge side branching point with each other, through which the cooling water can flow between the feed side branching point and the discharge side branching point in both directions;
a stack side cooling water pump able to change an amount of the cooling water discharged, but not able to change a direction of the cooling water discharged, the stack side cooling water pump being arranged in one of the stack inflow passage so that an outlet thereof faces the fuel cell stack and the stack outflow passage so that an inlet thereof faces the fuel cell stack;
a radiator side cooling water pump formed from a rotary pump changes a direction and amount of the cooling water discharged by a change of a drive speed thereof, the radiator side cooling water pump having a property that a discharge amount in a forward direction becomes greater as the drive speed becomes greater when the drive speed is a positive value and the discharge amount in a reverse direction becomes greater as the drive speed becomes smaller when the drive speed is a negative value, and the radiator side cooling water pump being arranged in one of the radiator inflow passage so that an outlet thereof, when the discharge direction is the forward direction, faces the radiator and the radiator outflow passage so that an inlet thereof, when the discharge direction is the forward direction, faces the radiator; and
a controller configured to control the stack side cooling water pump and the radiator side cooling water pump, respectively, to thereby control an amount of the cooling water flowing through the stack side cooling water passage, control an amount of the cooling water flowing through the radiator side cooling water passage, and change a direction and amount of the cooling water flowing through the bypass cooling water passage, respectively.

2. The fuel cell system according to claim 1,
wherein, if the stack side cooling water pump is driven and a drive speed of the radiator side cooling water pump is set to a radiator bypass speed which is a negative value, the cooling water having flowed through the stack side cooling water passage flows into the bypass cooling water passage while an insignificant amount of cooling water flows into the radiator side cooling water passage at the discharge side branching point, and
wherein the controller is configured to drive the stack side cooling water pump and set a drive speed of the radiator side cooling water pump to the radiator bypass speed to thereby perform a radiator full bypass mode operation where the cooling water circulates through the stack side cooling water passage and the bypass cooling water passage while an insignificant amount flows through the radiator side cooling water passage.

3. The fuel cell system according to claim 1,
wherein, if the stack side cooling water pump is driven and a drive speed of the radiator side cooling water pump is set to a radiator bypass speed which is a negative value, the cooling water having flowed through the stack side cooling water passage flows into the bypass cooling water passage while an insignificant amount flows into the radiator side cooling water passage at the discharge side branching point, and
wherein the controller is configured to drive the stack side cooling water pump and set a drive speed of the radiator side cooling water pump to one of a negative value greater than the radiator bypass speed, zero, and a positive value to thereby perform a radiator partial bypass mode operation where the cooling water circulates through the stack side cooling water passage and the bypass cooling water passage while it flows through the radiator side cooling water passage.

4. The fuel cell system according to claim 2, wherein the controller is configured to one of:
drive the stack side cooling water pump and set a drive speed of the radiator side cooling water pump to a positive value to thereby perform a bypass-less mode operation where the cooling water circulates through the stack side cooling water passage and the radiator side cooling water passage while an insignificant amount flows through the bypass cooling water passage; and
at least one of drive and stop the stack side cooling water pump and set a drive speed of the radiator side cooling water pump to a positive value to thereby perform a stack partial bypass mode operation where the cooling water circulates through the radiator side cooling water passage and the bypass cooling water passage while it flows through the stack side cooling water passage.

5. A method of control of a fuel cell system, the fuel cell system comprising:
a fuel cell stack configured to generate electric power by an electrochemical reaction between fuel gas and an oxidizing gas;
a radiator configured to lower a temperature of a cooling water for the fuel cell stack;
a cooling water feed passage connecting an outlet of an in-radiator cooling water passage in the radiator and an inlet of an in-stack cooling water passage in the fuel cell stack with each other, and a cooling water discharge passage connecting an outlet of the in-stack cooling water passage and an inlet of the in-radiator cooling water passage with each other, the cooling water feed passage comprising a feed side branching point, a radiator outflow passage from the outlet of the in-radiator cooling water passage to the feed side branching point, and a stack inflow passage from the feed side branching point to the inlet of the in-stack cooling water passage, the cooling water discharge passage comprising a discharge side branching point, a stack outflow passage from the outlet of the in-stack cooling water passage to the discharge side branching point, and a radiator inflow passage from the discharge side branching point to the inlet of the in-radiator cooling water passage, the stack inflow passage, the in-stack cooling water passage, and the stack outflow passage configuring a stack side cooling water passage, and the radiator inflow passage, the in-radiator cooling water passage, and the radiator outflow passage configuring a radiator side cooling water passage;
a bypass cooling water passage connecting the feed side branching point and the discharge side branching point with each other, through which the cooling water can flow between the feed side branching point and the discharge side branching point in both directions;
a stack side cooling water pump able to change an amount of the cooling water discharged, but not able to change a direction of the cooling water discharged, the stack side cooling water pump being arranged in one of the stack inflow passage so that an outlet thereof faces the fuel cell stack and the stack outflow passage so that an inlet thereof faces the fuel cell stack;
a radiator side cooling water pump formed from a rotary pump changes a direction and amount of the cooling water discharged by a change of a drive speed thereof, the radiator side cooling water pump having a property that a discharge amount in a forward direction becomes greater as the drive speed becomes greater when the drive speed is a positive value and the discharge amount in a reverse direction becomes greater as the drive speed becomes smaller when the drive speed is a negative value, and the radiator side cooling water pump being arranged in one of the radiator inflow passage so that an outlet thereof, when the discharge direction is the forward direction faces the radiator, and the radiator outflow passage so that an inlet thereof, when the discharge direction is the forward direction, faces the radiator; and
a controller configured to control the stack side cooling water pump and the radiator side cooling water pump, respectively,
wherein the method is configured to control the stack side cooling water pump and the radiator side cooling water pump by the controller, respectively, to thereby control an amount of the cooling water flowing through the stack side cooling water passage, control an amount of the cooling water flowing through the radiator side cooling water passage, and change a direction and amount of the cooling water flowing through the bypass cooling water passage, respectively.

6. A fuel cell system comprising:
a fuel cell stack configured to generate electric power by an electrochemical reaction between fuel gas and an oxidizing gas;
a radiator configured to lower a temperature of a cooling water for the fuel cell stack;
a cooling water feed passage connecting an outlet of an in-radiator cooling water passage in the radiator and an inlet of an in-stack cooling water passage in the fuel cell stack with each other, and a cooling water discharge passage connecting an outlet of the in-stack cooling water passage and an inlet of the in-radiator cooling water passage with each other, the cooling water feed passage comprising a feed side branching point, a radiator outflow passage from the outlet of the in-radiator cooling water passage to the feed side branching point, and a stack inflow passage from the feed side branching point to the inlet of the in-stack cooling water passage, the cooling water discharge passage comprising a discharge side branching point, a stack outflow passage from the outlet of the in-stack cooling water passage to the discharge side branching point, and a radiator inflow passage from the discharge side branching point to the inlet of the in-radiator cooling water passage, the stack inflow passage, the in-stack cooling water passage, and the stack outflow passage configuring a stack side cooling water passage, and the radiator inflow passage, the in-radiator cooling water passage, and the radiator outflow passage configuring a radiator side cooling water passage;

a bypass cooling water passage connecting the feed side branching point and the discharge side branching point with each other, through which the cooling water can flow between the feed side branching point and the discharge side branching point in both directions;

a stack side cooling water pump formed from a rotary pump able to change a direction and amount of the cooling water discharged by a change of a drive speed thereof, the stack side cooling water pump having a property that a discharge amount in a forward direction becomes greater as the drive speed becomes greater when the drive speed is a positive value and the discharge amount in a reverse direction becomes greater as the drive speed becomes smaller when the drive speed is a negative value, and the stack side cooling water pump being arranged in one of the stack inflow passage so that an outlet thereof, when the discharge direction is the forward direction, faces the fuel cell stack and the stack outflow passage so that an inlet thereof, when the discharge direction is the forward direction, faces the fuel cell stack;

a radiator side cooling water pump changes an amount of the cooling water discharged, but not able to change a direction of the cooling water discharged, the radiator side cooling water pump being arranged in one of the radiator inflow passage so that an outlet thereof faces the radiator and the radiator outflow passage so that an inlet thereof faces the radiator; and a controller configured to control the stack side cooling water pump and the radiator side cooling water pump, respectively, to thereby control an amount of the cooling water flowing through the stack side cooling water passage, control an amount of the cooling water flowing through the radiator side cooling water passage, and change a direction and amount of the cooling water flowing through the bypass cooling water passage, respectively.

7. The fuel cell system according to claim 6,
wherein, if the radiator side cooling water pump is driven and a drive speed of the stack side cooling water pump is set to a stack bypass speed which is a negative value, the cooling water having flowed through the radiator side cooling water passage flows into the bypass cooling water passage while an insignificant amount flows into the stack side cooling water passage at the feed side branching point, and wherein the controller is configured to drive the radiator side cooling water pump and set a drive speed of the stack side cooling water pump to the stack bypass speed to thereby perform a stack full bypass mode operation where the cooling water circulates through the radiator side cooling water passage and the bypass cooling water passage while an insignificant amount flows through the stack side cooling water passage.

8. The fuel cell system according to claim 6,
wherein, if the radiator side cooling water pump is driven and a drive speed of the stack side cooling water pump is set to a stack bypass speed which is a negative value, the cooling water having flowed through the radiator side cooling water passage flows into the bypass cooling water passage while an insignificant amount flows into the stack side cooling water passage at the feed side branching point, and wherein the controller is configured to drive the radiator side cooling water pump and set a drive speed of the stack side cooling water pump to one of a negative value greater than the stack bypass speed, zero, and a positive value to thereby perform a stack partial bypass mode operation where the cooling water circulates through the radiator side cooling water passage and the bypass cooling water passage while it flows through the stack side cooling water passage.

9. The fuel cell system according to claim 7, wherein the controller is configured to one of:

drive the radiator side cooling water pump and set a drive speed of the stack side cooling water pump to a positive value thereby perform a bypass-less mode operation where the cooling water circulates through the stack side cooling water passage and the radiator side cooling water passage while an insignificant amount flows through the bypass cooling water passage; and one of drive and stop the radiator side cooling water pump and set a drive speed of the stack side cooling water pump to a positive value to thereby perform a radiator partial bypass mode operation where the cooling water circulates through the stack side cooling water passage and the bypass cooling water passage while it flows through the radiator side cooling water passage.

10. A method of control of a fuel cell system, the fuel cell system comprising:

a fuel cell stack configured to generate electric power by an electrochemical reaction between fuel gas and an oxidizing gas;

a radiator configured to lower a temperature of a cooling water for the fuel cell stack;

a cooling water feed passage connecting an outlet of an in-radiator cooling water passage in the radiator and an inlet of an in-stack cooling water passage in the fuel cell stack with each other, and a cooling water discharge passage connecting an outlet of the in-stack cooling water passage and an inlet of the in-radiator cooling water passage with each other, the cooling water feed passage comprising a feed side branching point, a radiator outflow passage from the outlet of the in-radiator cooling water passage to the feed side branching point, and a stack inflow passage from the feed side branching point to the inlet of the in-stack cooling water passage, the cooling water discharge passage comprising a discharge side branching point, a stack outflow passage from the outlet of the in-stack cooling water passage to the discharge side branching point, and a radiator inflow passage from the discharge side branching point to the inlet of the in-radiator cooling water passage, the stack inflow passage, the in-stack cooling water passage, and the stack outflow passage configuring a stack side cooling water passage, and the radiator inflow passage, the in-radiator cooling water passage, and the radiator outflow passage configuring a radiator side cooling water passage;

a bypass cooling water passage connecting the feed side branching point and the discharge side branching point with each other, through which the cooling water can flow between the feed side branching point and the discharge side branching point in both directions;

a stack side cooling water pump formed from a rotary pump able to change a direction and amount of the cooling water discharged by a change of a drive speed thereof, the stack side cooling water pump having a property that a discharge amount in a forward direction becomes greater as the drive speed becomes greater when the drive speed is a positive value and the discharge amount in a reverse direction becomes greater as the drive speed becomes smaller when the drive speed is a negative value, and the stack side cooling water pump being arranged in one of the stack inflow passage so that an outlet thereof, when the discharge direction is the forward direction, faces the fuel cell stack and the stack outflow passage so that an inlet thereof, when the discharge direction is the forward direction, faces the fuel cell stack;

a radiator side cooling water pump changes an amount of the cooling water discharged, but not able to change a direction of the cooling water discharged, the radiator side cooling water pump being arranged in one of the radiator inflow passage so that an outlet thereof faces the radiator and the radiator outflow passage so that an inlet thereof faces the radiator; and a controller configured to control the stack side cooling water pump and the radiator side cooling water pump, respectively, wherein the method is configured to control the stack side cooling water pump and the radiator side cooling water pump by the controller, respectively, to thereby control an amount of the cooling water flowing through the stack side cooling water passage, control an amount of the cooling water flowing through the radiator side cooling water passage, and change a direction and amount of the cooling water flowing through the bypass cooling water passage, respectively.

11. A fuel cell system comprising:

a fuel cell stack configured to generate electric power by an electrochemical reaction between fuel gas and an oxidizing gas;

a radiator configured to lower a temperature of a cooling water for the fuel cell stack;

a cooling water feed passage connecting an outlet of an in-radiator cooling water passage in the radiator and an inlet of an in-stack cooling water passage in the fuel cell stack with each other, and a cooling water discharge passage connecting an outlet of the in-stack cooling water passage and an inlet of the in-radiator cooling water passage with each other, the cooling water feed passage comprising a feed side branching point, a radiator outflow passage from the outlet of the in-radiator cooling water passage to the feed side branching point, and a stack inflow passage from the feed side branching point to the inlet of the in-stack cooling water passage, the cooling water discharge passage comprising a discharge side branching point, a stack outflow passage from the outlet of the in-stack cooling water passage to the discharge side branching point, and a radiator inflow passage from the discharge side branching point to the inlet of the in-radiator cooling water passage, the stack inflow passage, the in-stack cooling water passage, and the stack outflow passage configuring a stack side cooling water passage, and the radiator inflow passage, the in-radiator cooling water passage, and the radiator outflow passage configuring a radiator side cooling water passage;

a bypass cooling water passage connecting the feed side branching point and the discharge side branching point with each other, through which the cooling water can flow between the feed side branching point and the discharge side branching point in both directions;

a stack side cooling water pump formed from a rotary pump able to change a direction and amount of the cooling water discharged by a change of a drive speed thereof, the stack side cooling water pump having a property that a discharge amount in a forward direction becomes greater as the drive speed becomes greater when the drive speed is a positive value and the discharge amount in a reverse direction becomes greater as the drive speed becomes smaller when the drive speed is a negative value, and stack side cooling water pump being arranged in one of the stack inflow passage so that an outlet thereof, when the discharge direction is the forward direction, faces the fuel cell stack and the stack outflow passage so that an inlet thereof, when the discharge direction is the forward direction, faces the fuel cell stack;

a radiator side cooling water pump formed from a rotary pump changes a direction and amount of the cooling water discharged by a change of a drive speed thereof, the radiator side cooling water pump having a property that a discharge amount in a forward direction becomes greater as the drive speed becomes greater when the drive speed is a positive value and the discharge amount in a reverse direction becomes greater as the drive speed becomes smaller when the drive speed is a negative value, and the radiator side cooling water pump being arranged in one of the radiator inflow passage so that an outlet thereof, when the discharge direction is the forward direction, faces the radiator and the radiator outflow passage so that an inlet thereof, when the discharge direction is the forward direction, faces the radiator; and a controller configured to control the stack side cooling water pump and the radiator side cooling water pump, respectively, to thereby control an amount of the cooling water flowing through the stack side cooling water passage, control an amount of the cooling water flowing through the radiator side cooling water passage, and change a direction and amount of the cooling water flowing through the bypass cooling water passage, respectively.

12. The fuel cell system according to claim 11, wherein, if a drive speed of the stack side cooling water pump is set to a positive value and a drive speed of the radiator side cooling water pump is set to a radiator bypass speed which is a negative value, the cooling water having flowed through the stack side cooling water passage flows into the bypass cooling water passage while an insignificant amount flows into the radiator side cooling water passage at the discharge side branching point, and wherein the controller is configured to set the drive speed of the stack side cooling water pump to a positive value and set a drive speed of the radiator side cooling water pump to the radiator bypass speed to thereby perform a radiator full bypass mode operation where the cooling water circulates through the stack side cooling water passage and the bypass cooling water passage while an insignificant amount flows through the radiator side cooling water passage.

13. The fuel cell system according to claim 11, wherein, if a drive speed of the stack side cooling water pump is set to a positive value and a drive speed of the radiator side cooling water pump is set to a radiator bypass speed which is a negative value, the cooling water having flowed through the stack side cooling water passage flows into the bypass cooling water passage while an insignificant amount flows into the radiator side cooling water passage at the discharge side branching point, and wherein the controller is configured to set a drive speed of the stack side cooling water pump to a positive value and set a drive speed of the radiator side cooling water pump to one of a negative value greater than the radiator bypass speed, zero, and a positive value, to thereby perform a radiator partial bypass mode operation where the cooling water circulates through the stack side cooling water passage and the bypass cooling water passage while it flows through the radiator side cooling water passage.

14. The fuel cell system according to claim 11, wherein, if a drive speed of the radiator side cooling water pump is set to a positive value and a drive speed of the stack side cooling water pump is set to a stack bypass speed which is a negative value, the cooling water having flowed through the radiator side cooling water passage flows into the bypass cooling water passage while an insignificant amount flows into the stack side cooling water passage at the feed side branching point, and wherein the controller is configured to set a drive speed of the radiator side cooling water pump to a positive value and set a drive speed of the stack side cooling water pump to the stack bypass speed to thereby perform a stack full bypass mode operation where the cooling water circulates through the radiator side cooling water passage and the bypass cooling water passage while an insignificant amount flows through the stack side cooling water passage.

15. The fuel cell system according to claim 11, wherein, if a drive speed of the radiator side cooling water pump is set to a positive value and a drive speed of the stack side cooling water pump is set to a stack bypass speed which is a negative value, the cooling water having flowed through the radiator side cooling water passage flows into the bypass cooling water passage while an insignificant amount flows into the stack side cooling water passage at the feed side branching point, and wherein the controller is configured to set a drive speed of the radiator side cooling water pump to a positive value and set a drive speed of the stack side cooling water pump to one of a negative value greater than the stack bypass speed, zero, and a positive value, to thereby perform a stack partial bypass mode operation where the cooling water circulates through the radiator side cooling water passage and the bypass cooling water passage while it flows through the stack side cooling water passage.

16. The fuel cell system according to claim 12, wherein the controller is configured to set a drive speed of the stack side cooling water pump to a positive value and set a drive speed of the radiator side cooling water pump to a positive value to thereby perform a bypass-less mode operation where the cooling water circulates through the stack side cooling water passage and the radiator side cooling water passage while an insignificant amount flows through the bypass cooling water passage.

17. A method of control of a fuel cell system, the fuel cell system comprising:

a fuel cell stack configured to generate electric power by an electrochemical reaction between fuel gas and an oxidizing gas;

a radiator configured to lower a temperature of a cooling water for the fuel cell stack;

a cooling water feed passage connecting an outlet of an in-radiator cooling water passage in the radiator and an inlet of an in-stack cooling water passage in the fuel cell stack with each other, and a cooling water discharge passage connecting an outlet of the in-stack cooling water passage and an inlet of the in-radiator cooling water passage with each other, the cooling water feed passage comprising a feed side branching point, a radiator outflow passage from the outlet of the in-radiator cooling water passage to the feed side branching point, and a stack inflow passage from the feed side branching point to the inlet of the in-stack cooling water passage, the cooling water discharge passage comprising a discharge side branching point, a stack outflow passage from the outlet of the in-stack cooling water passage to the discharge side branching point, and a radiator inflow passage from the discharge side branching point to the inlet of the in-radiator cooling water passage, the stack inflow passage, the in-stack cooling water passage, and the stack outflow passage configuring a stack side cooling water passage, and the radiator inflow passage, the in-radiator cooling water passage, and the radiator outflow passage configuring a radiator side cooling water passage;

a bypass cooling water passage connecting the feed side branching point and the discharge side branching point with each other, through which the cooling water can flow between the feed side branching point and the discharge side branching point in both directions;

a stack side cooling water pump formed from a rotary pump able to change a direction and amount of the cooling water discharged by a change of a drive speed thereof, the stack side cooling water pump having a property that a discharge amount in a forward direction becomes greater as the drive speed becomes greater when the drive speed is a positive value and the discharge amount in a reverse direction becomes greater as the drive speed becomes smaller when the drive speed is a negative value, the stack side cooling water pump being arranged in one of the stack inflow passage so that an outlet thereof, when the discharge direction is the forward direction, faces the fuel cell stack and the stack outflow passage so that an inlet thereof, when the discharge direction is the forward direction, faces the fuel cell stack;

a radiator side cooling water pump formed from a rotary pump changes a direction and amount of the cooling water discharged by a change of a drive speed thereof, the radiator side cooling water pump having a property that a discharge amount in a forward direction becomes greater as the drive speed becomes greater when the drive speed is a positive value and the discharge amount in a reverse direction becomes greater as the drive speed becomes smaller when the drive speed is a negative value, the radiator side cooling water pump being arranged in one of the radiator inflow passage so that an outlet thereof when the discharge direction is the forward direction faces the radiator and the radiator outflow passage so that an inlet thereof when the discharge direction is the forward direction faces the radiator; and a controller configured to control the stack side cooling water pump and the radiator side cooling water pump, respectively, wherein the method is configured to control the stack side cooling water pump and the radiator side cooling water pump by the controller, respectively, to thereby control an amount of the cooling water flowing through the stack side cooling water passage, control an amount of the cooling water flowing through the radiator side cooling water passage, and change a direction and amount of the cooling water flowing through the bypass cooling water passage, respectively.

* * * * *